(12) United States Patent
Shizu et al.

(10) Patent No.: US 11,828,512 B2
(45) Date of Patent: Nov. 28, 2023

(54) MOTOR DRIVING DEVICE AND REFRIGERATION CYCLE APPARATUS

(71) Applicant: Mitsubishi Electric Corporation, Tokyo (JP)

(72) Inventors: Keiichiro Shizu, Tokyo (JP); Masaki Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 427 days.

(21) Appl. No.: 17/293,523

(22) PCT Filed: Feb. 25, 2019

(86) PCT No.: PCT/JP2019/006995
§ 371 (c)(1),
(2) Date: May 13, 2021

(87) PCT Pub. No.: WO2020/174520
PCT Pub. Date: Sep. 3, 2020

(65) Prior Publication Data
US 2022/0003474 A1 Jan. 6, 2022

(51) Int. Cl.
*F25B 49/02* (2006.01)
*F25B 13/00* (2006.01)

(52) U.S. Cl.
CPC ............ *F25B 49/025* (2013.01); *F25B 13/00* (2013.01); *F25B 2600/021* (2013.01); *F25B 2600/024* (2013.01)

(58) Field of Classification Search
CPC .. F25B 49/025; F25B 13/00; F25B 2600/021; F25B 2600/024; H02P 3/22; H02P 25/18; H02P 27/06
See application file for complete search history.

(56) References Cited

FOREIGN PATENT DOCUMENTS

| JP | 2007-223436 A | | 9/2007 |
|---|---|---|---|
| JP | 2009-225617 A | | 10/2009 |
| JP | 2009225617 A | * | 10/2009 |
| JP | 2016-086587 A | | 5/2016 |
| JP | 2016086587 A | * | 5/2016 |

* cited by examiner

Primary Examiner — Emmanuel E Duke
(74) Attorney, Agent, or Firm — POSZ LAW GROUP, PLC

(57) ABSTRACT

A motor driving device that drives a motor and is capable of switching a connection state of stator windings of the motor, includes: relays to switch the connection state of the stator windings by switching positions of contact plates; and a contact control unit to control each of the positions of the contact plates by outputting, to the relays, signals for actuating the contact plates. The contact control unit switches the connection state by sequentially switching output values of the signals such that the output values of the signals are switched at different timings from each other in the relays, and changes a switching order every time the connection state is switched, the switching order being an order in which the output values of the signals are switched.

15 Claims, 18 Drawing Sheets

FIG.2
SIGNALS OUTPUT FROM
CONTACT CONTROL UNIT
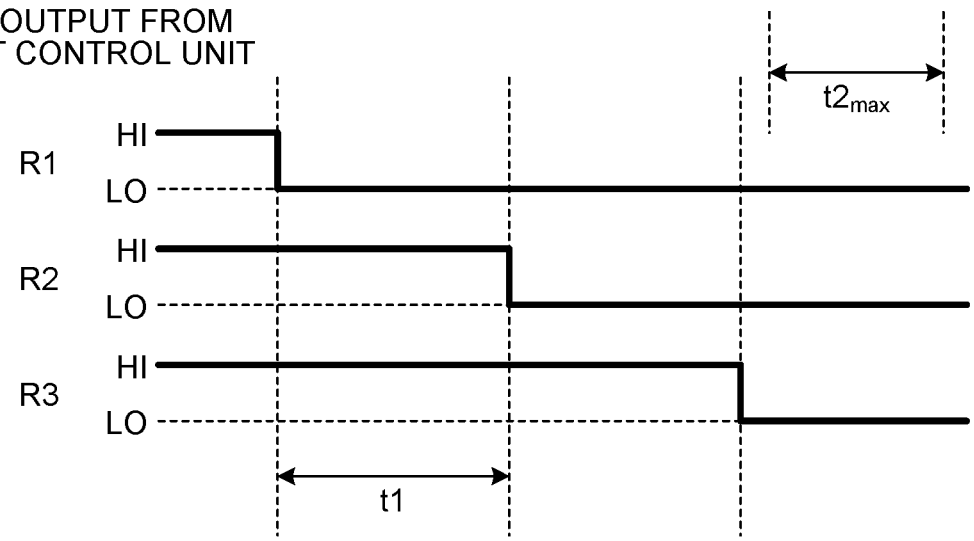
OPERATION OF CONTACT PLATES
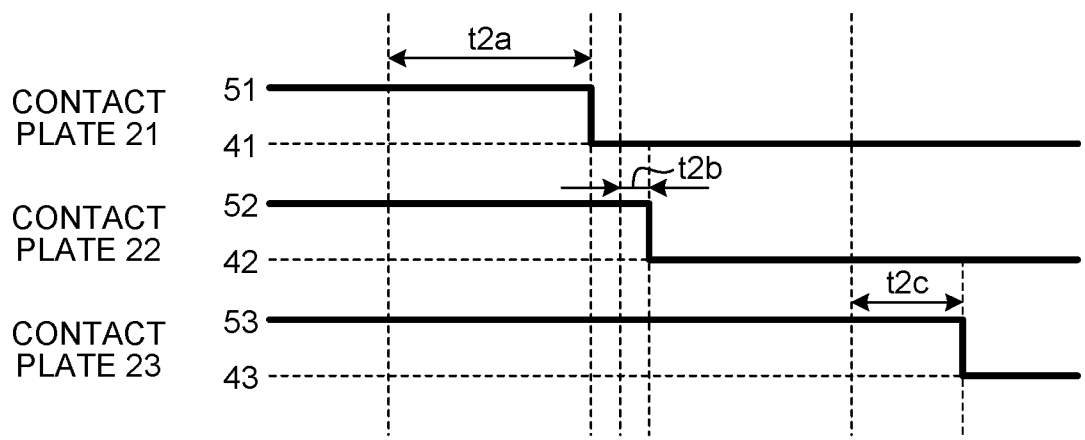

| | | | |
|---|---|---|---|
| SWITCHING ORDER Ax | R1 | R2 | R3 |
| SWITCHING ORDER Bx | R2 | R3 | R1 |
| SWITCHING ORDER Cx | R3 | R1 | R2 |
| SWITCHING ORDER Dx | R1 | R3 | R2 |
| SWITCHING ORDER Ex | R3 | R2 | R1 |
| SWITCHING ORDER Fx | R2 | R1 | R3 |

MOTOR DRIVING DEVICE AND REFRIGERATION CYCLE APPARATUS

CROSS REFERENCE TO RELATED APPLICATION

This application is a U.S. national stage application of International Patent Application No. PCT/JP2019/006995 filed on Feb. 25, 2019, the disclosure of which is incorporated herein by reference.

TECHNICAL FIELD

The present invention relates to a motor driving device and a refrigeration cycle apparatus capable of switching a connection state of a stator winding of a motor.

BACKGROUND

Examples of a motor driving device capable of switching a connection state of stator windings of a motor include a device that can switch between a star connection and a delta connection by relays that use coils. For example, a motor driving device for a compressor in an air conditioner desirably drives a motor in a star connection state under low load conditions under which contribution to the annual power consumption is high and drives a motor in a delta connection state under high load conditions. Such operations can improve the driving efficiency under low load conditions and can also achieve high output under high load conditions.

When the connection state is switched, an instantaneous large current is generated. This current may cause a failure of a control circuit; therefore, it is desirable to reduce current that is generated when the connection state is switched. The motor described in Patent Literature 1 uses first coil units, second coil units, and switching elements to switch between a star connection and a delta connection, and uses preparatory loads at the timing of switching the connection state to suppress generation of an instantaneous large current at the time of the switching.

PATENT LITERATURE

Patent Literature 1: Japanese Patent Application Laid-open No. 2016-86587

With the technique of Patent Literature 1 described above, however, even when current is caused to flow to a plurality of coils on the switching circuit at the same time, the operation timing varies between the contact plates of the relays due to manufacturing variations between the contact plates. The order in which the contact plates operate is determined depending on the manufacturing variations between the contact plates. For this reason, the contact plates operate in the same order every time the connection state is switched. This means that arc discharge between contact plates occurs exclusively in a specific relay. Therefore, there is a problem in that a specific relay can have a high probability of component failure such as welding between contacts, or contact sticking, and thus the life of the motor driving device is reduced.

SUMMARY

The present invention has been achieved in view of the above and an object of the present invention is to provide a motor driving device capable of preventing or inhibiting a specific relay from having a high probability of failure and thus extending the life of the relays as a whole.

In order to solve the above problems and achieve the object, an aspect of the present invention is a motor driving device that drives a motor and is capable of switching a connection state of stator windings of the motor. The motor driving device includes: a plurality of relays to switch the connection state of the stator windings by switching positions of contact plates; and a contact control unit to control each of the positions of the contact plates by outputting, to a corresponding one of the relays, a signal for actuating a corresponding one of the contact plates. The contact control unit switches the connection state by sequentially switching output values of the signals such that the output values of the signals are switched at different timings from each other in the relays, and changes a switching order every time the connection state is switched, the switching order being an order in which the output values of the signals are switched.

The motor driving device according to the present invention produces an effect where a specific relay can be prevented or inhibited from having a high probability of failure and the life of the relays as a whole can be extended.

BRIEF DESCRIPTION OF DRAWINGS

FIG. 2 is a timing chart illustrating exemplary switching timings of signals output from a contact control unit of the motor driving device according to the first embodiment and the operation timings of contact plates.

DETAILED DESCRIPTION

A motor driving device and a refrigeration cycle apparatus according to embodiments of the present invention will be explained below in detail with reference to the drawings. This invention is not limited to the embodiments.

First Embodiment

Figure 1:
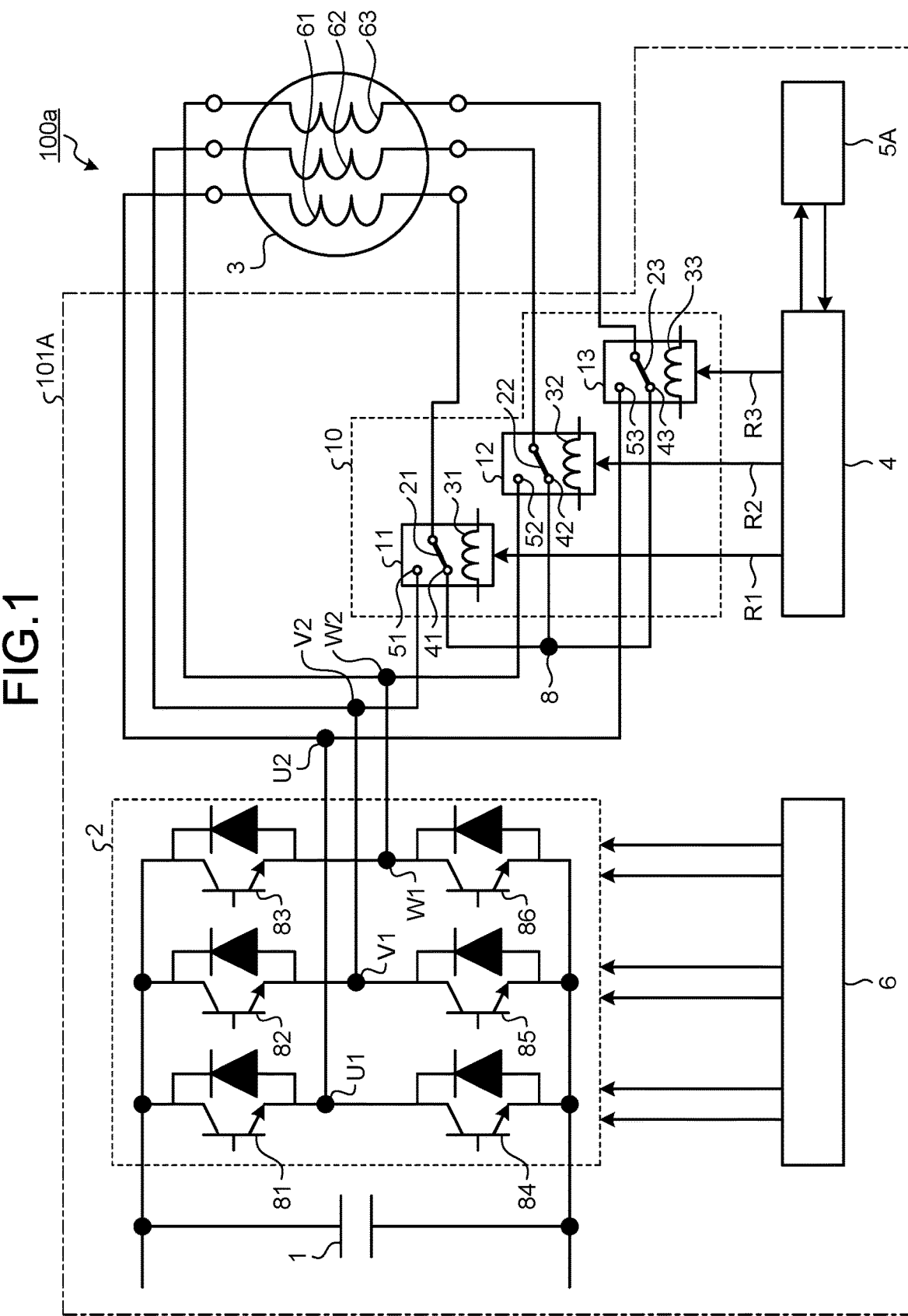
FIG. 1 is a diagram illustrating an exemplary configuration of a motor driving system that includes a motor driving device according to a first embodiment.

FIG. 1 is a diagram illustrating an exemplary configuration of a motor driving system that includes a motor driving device according to a first embodiment. A motor driving system 100a according to the first embodiment includes a motor driving device 101A and a motor 3. The motor driving device 101A includes a capacitor 1, an inverter 2, a contact control unit 4, a control order storage unit 5A, an inverter control circuit 6, and a connection state switching unit 10.

The capacitor 1 holds direct-current power supplied from a converter or the like (not illustrated) as direct-current voltage. The inverter 2 generates power to be supplied to the motor 3. The inverter 2 converts the direct-current voltage held in the capacitor 1 into alternating-current voltage by pulse width modulation and applies the alternating-current voltage to the motor 3 to be driven.

The inverter 2 includes switching elements 81 to 86 that are semiconductor switching elements. The switching elements 81 to 83 form upper-arm switching elements and the switching elements 84 to 86 form lower-arm switching elements. The upper-arm switching element 81 and the lower-arm switching element 84 are connected in series to form a U-phase switching element pair. In a similar manner, the upper-arm switching element 82 and the lower-arm switching element 85 are connected in series to form a V-phase switching element pair, and the upper-arm switching element 83 and the lower-arm switching element 86 are connected in series to form a W-phase switching element pair.

A connection point U1 between the upper-arm switching element 81 and the lower-arm switching element 84 is drawn out of the inverter 2 and is connected to a connection point U2. A connection point V1 between the upper-arm switching element 82 and the lower-arm switching element 85 is drawn out of the inverter 2 and is connected to a connection point V2. A connection point W1 between the upper-arm switching element 83 and the lower-arm switching element 86 is drawn out of the inverter 2 and is connected to a connection point W2. A publicly known circuit can be used for the inverter control circuit 6 that controls the switching elements 81 to 86 of the inverter 2.

The motor 3 is configured such that each of three stator windings 61, 62, and 63 is open at both ends, and thus can change the connection state.

The connection state switching unit 10 includes relays 11 to 13 and switches the connection state of the stator windings 61 to 63 of the motor 3 to a star connection or a delta connection. The relays 11 to 13 are each a change-over-contact relay and each include a contact plate and a coil. The contact plate has one terminal connected to the stator winding and has the other terminal connected to a first contact or a second contact. The coil is used for causing the contact plate to operate.

Specifically, the relay 11 includes a contact plate 21, contacts 41 and 51, and a coil 31. When current does not flow in the coil 31, the contact plate 21 is connected to the contact 41 that is the first contact. When current flows in the coil 31, the contact plate 21 is connected to the contact 51 that is the second contact.

In a similar manner, the relay 12 includes a contact plate 22, contacts 42 and 52, and a coil 32. When current does not flow in the coil 32, the contact plate 22 is connected to the contact 42 that is the first contact. When current flows in the coil 32, the contact plate 22 is connected to the contact 52 that is the second contact.

The relay 13 includes a contact plate 23, contacts 43 and 53, and a coil 33. When current does not flow in the coil 33, the contact plate 23 is connected to the contact 43 that is the first contact. When current flows in the coil 33, the contact plate 23 is connected to the contact 53 that is the second contact.

The contacts 41, 42, and 43 are connected to a neutral terminal 8. The contacts 51, 52, and 53 are respectively connected to the three output terminals of the inverter 2. Specifically, the contact 51 is connected to the connection point V1 via the connection point V2, the contact 52 is connected to the connection point W1 via the connection point W2, and the contact 53 is connected to the connection point U1 via the connection point U2.

Each of the three stator windings 61, 62, and 63 of the motor 3 has one terminal connected to a corresponding one of the three output terminals of the inverter 2 and has the other terminal connected to a corresponding one of the contact plates 21, 22, and 23 of the three relays 11, 12, and 13. Specifically, the stator winding 61 is connected at one end to the contact plate 21 and is connected at the other end to the connection point U2. The stator winding 62 is connected at one end to the contact plate 22 and is connected at the other end to the connection point V2. The stator winding 63 is connected at one end to the contact plate 23 and is connected at the other end to the connection point W2.

The contact control unit 4 controls the connection state switching unit 10. The contact control unit 4 causes the contact plates 21 to 23 of the relays 11 to 13 to operate to change the connection state of the stator windings 61 to 63 of the motor 3. The contact control unit 4 outputs a signal R1 to the coil 31 to control the operation of the contact plate 21, outputs a signal R2 to the coil 32 to control the operation of the contact plate 22, and outputs a signal R3 to the coil 33 to control the operation of the contact plate 23.

The signals R1, R2, and R3 are signals for allowing current to flow to the coils 31, 32, and 33, respectively. The contact control unit 4 causes current to flow to the coils 31 to 33 to move the contact plates 21 to 23 that are moving parts. The contact plates 21 to 23 are each configured from a member that mechanically operates, and the contact plates 21 to 23 may operate at different times due to manufacturing variations between the contact plates 21 to 23. Variations in the operation time are in the order of milliseconds, for example.

The contact control unit 4 selects a switching order from a switching order table to be described later, in which a plurality of types of switching orders are set, and switches the output values of the signals R1, R2, and R3 from HI (High: On) to LO (Low: Off) or from LO to HI according to the selected switching order. Each switching order defines the order in which the signals R1, R2, and R3 are switched from HI to LO or from LO to HI. For example, one of the switching orders defines that the signal R1 is switched from HI to LO, then the signal R2 is switched from HI to LO, and then the signal R3 is switched from HI to LO. The contact control unit 4 stores the switching order selected and used in the control order storage unit 5A. The control order storage unit 5A is, for example, a memory that stores a history of the switching orders sent from the contact control unit 4. It is sufficient if the control order storage unit 5A stores the latest five switching orders selected by the contact control unit 4.

As described above, the contact control unit 4 controls the positions (connection positions) of the contact plates 21 to 23 by outputting, to the contact plates 21 to 23, the signals R1 to R3 for actuating the contact plates 21 to 23. The relays 11 to 13 switch the connection state of the stator windings 61 to 63 by switching the positions of the contact plates 21 to 23. The contact control unit 4 in the first embodiment sequentially switches the output values of the signals R1 to R3 such that the output values of the signals R1 to R3 are switched at different timings from one another in the coils 31 to 33, thereby switching the connection state. Moreover, the contact control unit 4 changes the switching order every time the connection state is switched, based on the switching order stored in the control order storage unit 5A.

Next, a description will be given of the operation of switching the connection state of the stator windings 61 to 63 of the motor 3 by the motor driving device 101A. FIG. 2 is a timing chart illustrating exemplary switching timings of the signals output from the contact control unit of the motor driving device according to the first embodiment and the operation timings of the contact plates.

The upper portion in FIG. 2 illustrates the switching timings between HI and LO of the signals R1, R2, and R3 output from the contact control unit 4 to switch the connection state of the stator windings 61 to 63 of the motor 3. The lower portion in FIG. 2 illustrates the operation timings of the contact plates 21, 22, and 23 that are actuated by the signals R1, R2, and R3.

The contact control unit 4 outputs the signals R1, R2, and R3 with a time difference t1 between the switching timings thereof so that the signals R1, R2, and R3 are switched from HI to LO or from LO to HI at different timings from one another. The time difference t1 is longer than a maximum delay time (time period) $t2_{max}$ that is the maximum time of variations in the operation time of the contact plates 21 to 23.

As illustrated in FIG. 2, the contact control unit 4 switches the output value of the signal R2 from HI to LO after the time difference t1 from the time the output value of the signal R1 is switched from HI to LO. Further, the contact control unit 4 switches the output value of the signal R3 from HI to LO after the time difference t1 from the time the output value of the signal R2 is switched from HI to LO.

In such a case, assume that the differential delay times (time periods) that are delay times of operation of the contact plates 21, 22, and 23 are differential delay times t2a, t2b, and t2c, respectively. In this case, the contact plate 21 operates after the differential delay time t2a from the time the contact control unit 4 switches the output value of the signal R1 from HI to LO. In a similar manner, the contact plate 22 operates after the differential delay time t2b from the time the contact control unit 4 switches the output value of the signal R2 from HI to LO, and the contact plate 23 operates after the differential delay time t2c from the time the contact control unit 4 switches the output value of the signal R3 from HI to LO.

When the differential delay time t2a is equal to the maximum delay time $t2_{max}$, the time from when the contact plate 21 operates to when the output value of the signal R2 switches from HI to LO is minimum. Even in such a case, the output value of the signal R2 is switched from HI to LO with a time margin of $t1-t2_{max}(t2a)$ after the contact plate 21 operates; therefore, the contact plate 22 does not operate before the contact plate 21.

Figure 3:
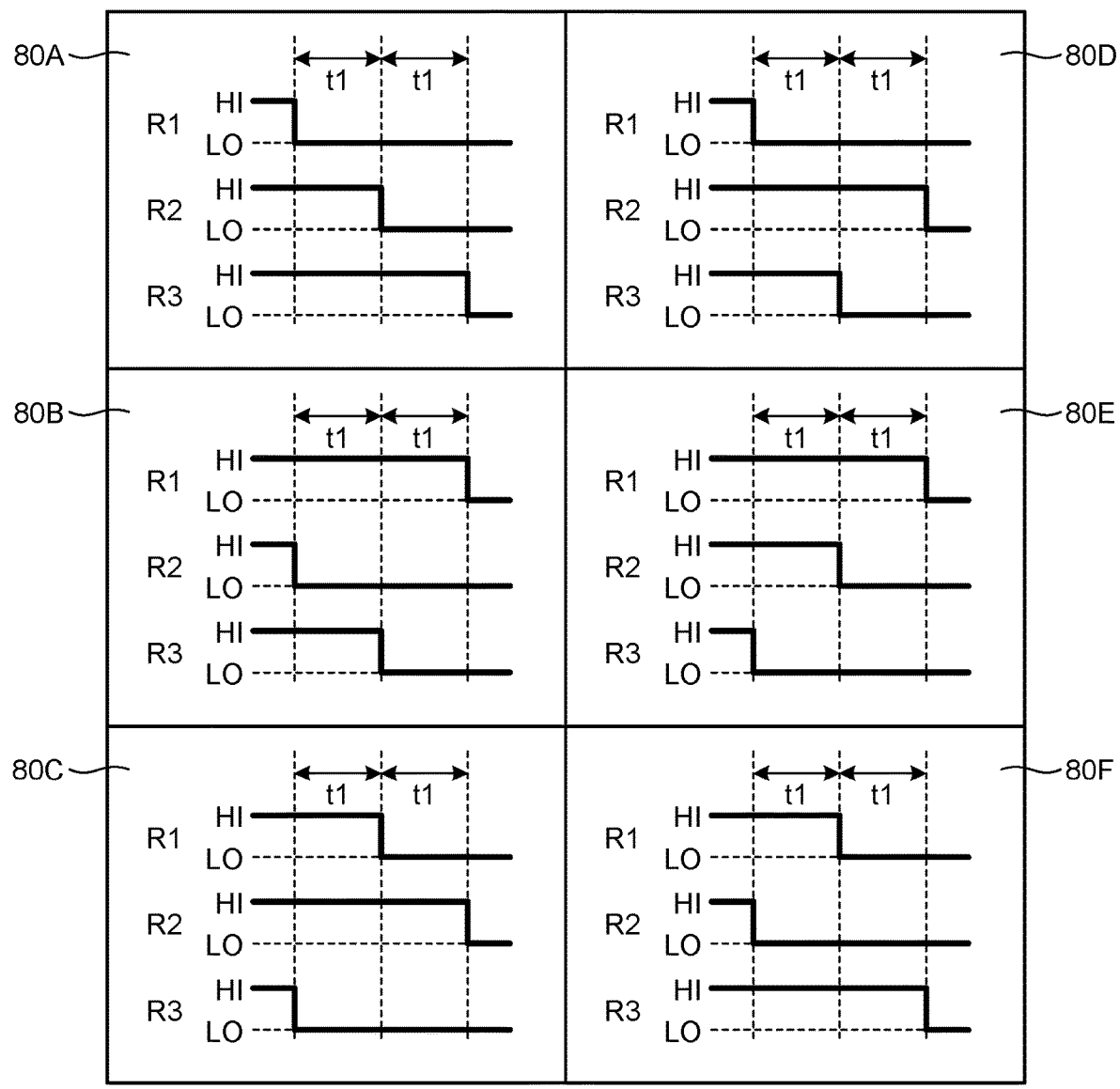
FIG. 3 is a diagram illustrating a list of the switching timings of signals output from the contact control unit of the motor driving device according to the first embodiment when switching the connection state from a delta connection to a star connection.

FIG. 3 is a diagram illustrating a list of the switching timings of the signals output from the contact control unit of the motor driving device according to the first embodiment when switching the connection state from a delta connection to a star connection. FIG. 3 illustrates a list of the timing charts indicating the switching orders of the output values of the signals R1, R2, and R3 when the contact control unit 4 switches the connection state of the stator windings 61 to 63 from a delta connection to a star connection.

In a case when the connection state is switched from a delta connection to a star connection, there are six order patterns in which the output values of the signals R1, R2, and R3 are switched, i.e., timing charts 80A to 80F illustrated in FIG. 3. Each of the timing charts 80A to 80F indicates that, after the time difference t1 elapses from the time the output value of a signal is switched, the output value of the next signal is switched.

In the timing chart 80A, the output value of the signal R1, the output value of the signal R2, and the output value of the signal R3 are switched from HI to LO in that order. In the timing chart 80B, the output value of the signal R2, the output value of the signal R3, and the output value of the signal R1 are switched from HI to LO in that order. In the timing chart 80C, the output value of the signal R3, the output value of the signal R1, and the output value of the signal R2 are switched from HI to LO in that order. In the timing chart 80D, the output value of the signal R1, the output value of the signal R3, and the output value of the signal R2 are switched from HI to LO in that order. In the timing chart 80E, the output value of the signal R3, the output value of the signal R2, and the output value of the signal R1 are switched from HI to LO in that order. In the timing chart 80F, the output value of the signal R2, the output value of the signal R1, and the output value of the signal R3 are switched from HI to LO in that order. The order in which the contact plates 21, 22, and 23 operate is uniquely determined according to the switching order of the output values of the signals R1, R2, and R3 as described above; therefore, a description thereof will be omitted.

Figures 4, 5:
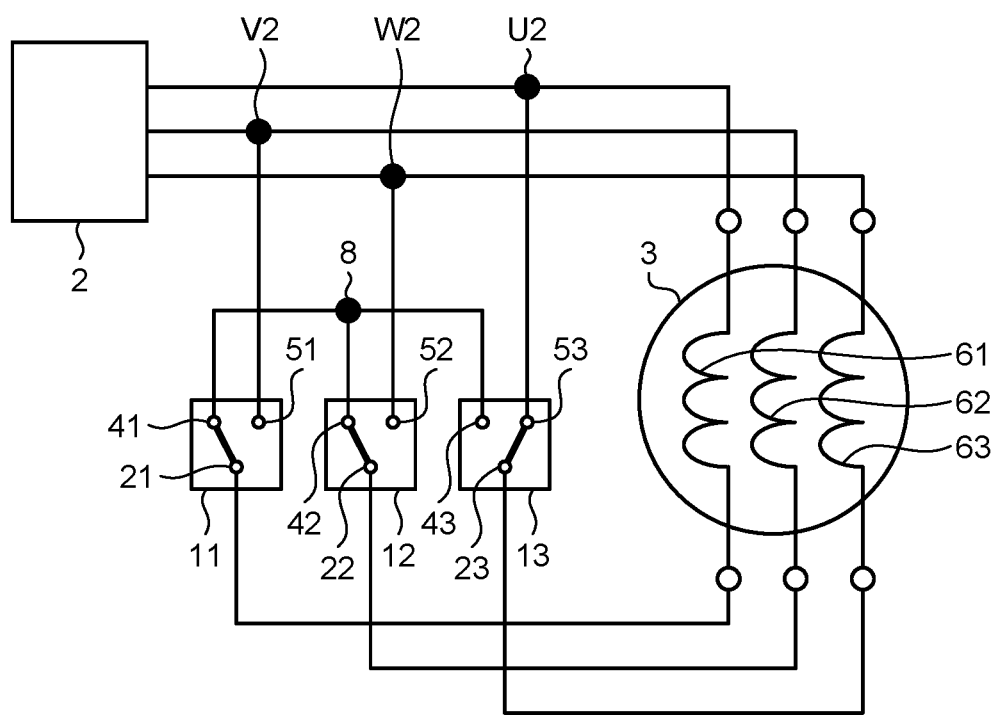
FIG. 4 is a diagram illustrating a configuration of a switching order table used by the motor driving device according to the first embodiment when switching the connection state from a delta connection to a star connection.
FIG. 5 is a diagram illustrating a first example of the connection state of stator windings when the motor driving device according to the first embodiment switches the connection state from a delta connection to a star connection.

FIG. 4 is a diagram illustrating a configuration of the switching order table used by the motor driving device according to the first embodiment when switching the connection state from a delta connection to a star connection. FIG. 4 illustrates a switching order table 800 corresponding to the timing charts 80A to 80F illustrated in FIG. 3.

The switching order table 800 is a table in which the switching orders to be selected by the contact control unit 4 are set. In the switching order table 800, the switching orders corresponding to the timing charts 80A to 80F are indicated as switching orders Ax to Fx, respectively. For example, the switching order Bx corresponding to the timing chart 80B defines that the output value of the signal R2, the output value of the signal R3, and the output value of the signal R1 are switched in that order.

The contact control unit 4 selects a different one of the six switching orders set in the switching order table 800 every time the connection state of the stator windings 61 to 63 is switched, thereby switching the order in which the contact plates 21, 22, and 23 operate. The contact control unit 4 stores the selected switching order in the control order storage unit 5A. When the control order storage unit 5A stores the latest five switching orders selected, the contact control unit 4 need only select the switching order that is not stored in the control order storage unit 5A. Consequently, the contact control unit 4 can select the six switching orders uniformly.

If the control order storage unit 5A stores only four or less latest switching orders selected, the contact control unit 4 randomly selects a switching order from among the switching orders that are not stored in the control order storage unit 5A. For example, if the control order storage unit 5A stores only one latest switching order selected, the contact control unit 4 randomly selects a switching order from among five switching orders that are not stored in the control order storage unit 5A.

Figure 6:
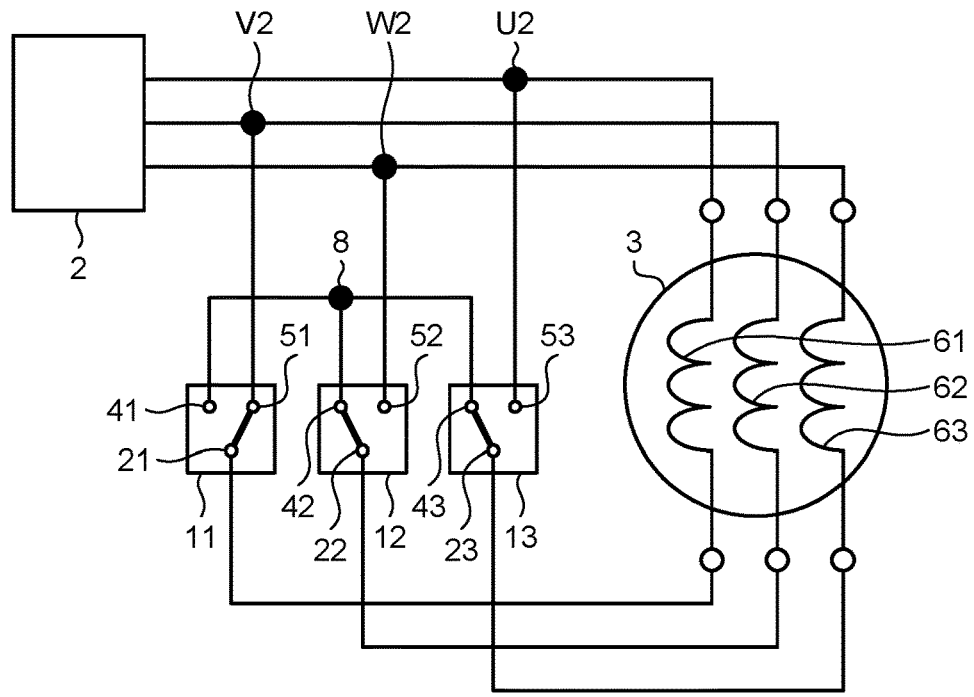
FIG. 6 is a diagram illustrating a second example of the connection state of the stator windings when the motor driving device according to the first embodiment switches the connection state from a delta connection to a star connection.
Figure 7:
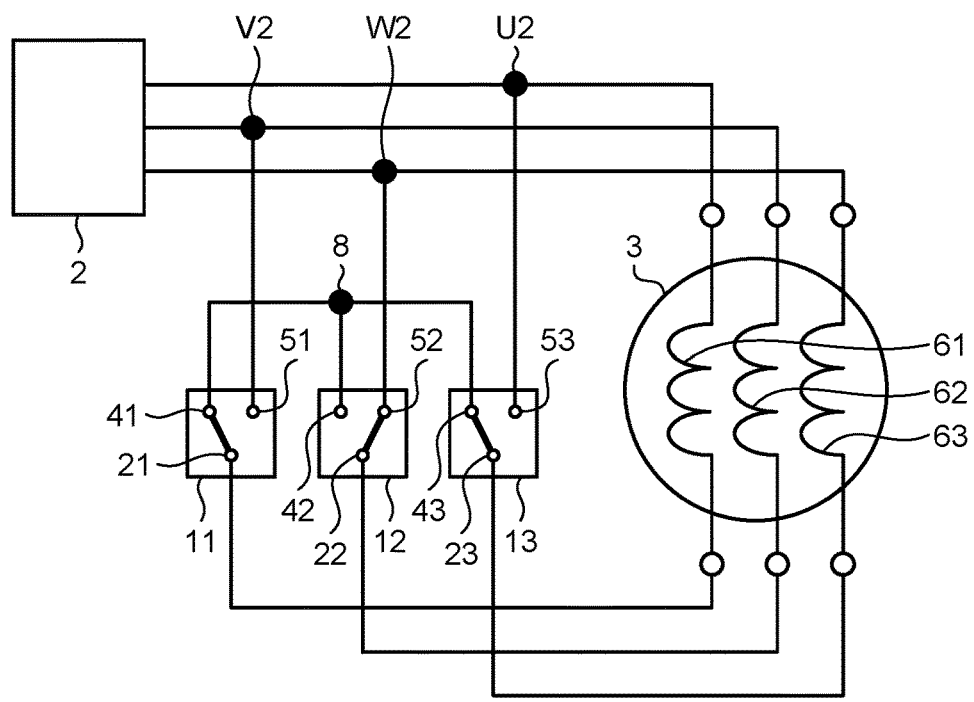
FIG. 7 is a diagram illustrating a third example of the connection state of the stator windings when the motor driving device according to the first embodiment switches the connection state from a delta connection to a star connection.

A description will be given here of an example of transition of the connection state of the stator windings 61 to 63 when the contact control unit 4 switches the output values of the signals R1, R2, and R3 to switch the connection state from a delta connection to a star connection. FIG. 5 is a diagram illustrating a first example of the connection state of the stator windings when the motor driving device according to the first embodiment switches the connection state from a delta connection to a star connection. FIG. 6 is a diagram illustrating a second example of the connection state of the stator windings when the motor driving device according to the first embodiment switches the connection state from a delta connection to a star connection. FIG. 7 is a diagram illustrating a third example of the connection state of the stator windings when the motor driving device according to the first embodiment switches the connection state from a delta connection to a star connection.

FIG. 5 illustrates the connection state between the second signal switching and the third signal switching in the timing chart 80A illustrated in FIG. 3. FIG. 6 illustrates the connection state between the second signal switching and the third signal switching in the timing chart 80B illustrated in FIG. 3. FIG. 7 illustrates the connection state between the second signal switching and the third signal switching in the timing chart 80C illustrated in FIG. 3. Note that FIGS. 5 to 7 illustrate the connection states after the contact plates have operated as a result of the second signal switching.

In the period between the second signal switching and the third signal switching in the timing charts 80A to 80C illustrated in FIG. 3, two of the contact plates 21, 22, and 23 are connected to the neutral terminal 8. When the second signal switching is performed, open ends of two of the three stator windings 61 to 63 are shorted through the neutral terminal 8; therefore, short-circuit current is generated in two contact plates.

In the case of the connection state illustrated in FIG. 5, short-circuit current is generated in the contact plates 21 and 22. In the case of the connection state illustrated in FIG. 6, short-circuit current is generated in the contact plates 22 and 23. In the case of the connection state illustrated in FIG. 7, short-circuit current is generated in the contact plates 21 and 23.

Moreover, generation of short-circuit current due to the transient connection state of the stator windings 61 to 63 between the first signal switching and the second signal switching can be distributed by the contact control unit 4 selecting each of the timing charts 80D to 80F (switching orders Dx to Fx). Short-circuit current is generated in the contact plates 22 and 23 between the first signal switching and the second signal switching in the timing chart 80D. Short-circuit current is generated in the contact plates 21 and 22 between the first signal switching and the second signal switching in the timing chart 80E. Short-circuit current is generated in the contact plates 21 and 23 between the first signal switching and the second signal switching in the timing chart 80F.

In the first embodiment, the contact control unit 4 selects a different timing chart from among the timing charts 80A to 80F (switching orders Ax to Fx) every time the connection state is switched from a delta connection to a star connection, so that the contact plate in which short-circuit current is to be generated among the contact plates 21, 22, and 23 can be changed in a distributed manner. The contact control unit 4 may select a different timing chart from among the timing charts 80A to 80C (switching orders Ax to Cx) every time the connection state is switched. Alternatively, the contact control unit 4 may select a different timing chart from among the timing charts 80D to 80F (switching orders Dx to Fx) every time the connection state is switched.

Figure 8:
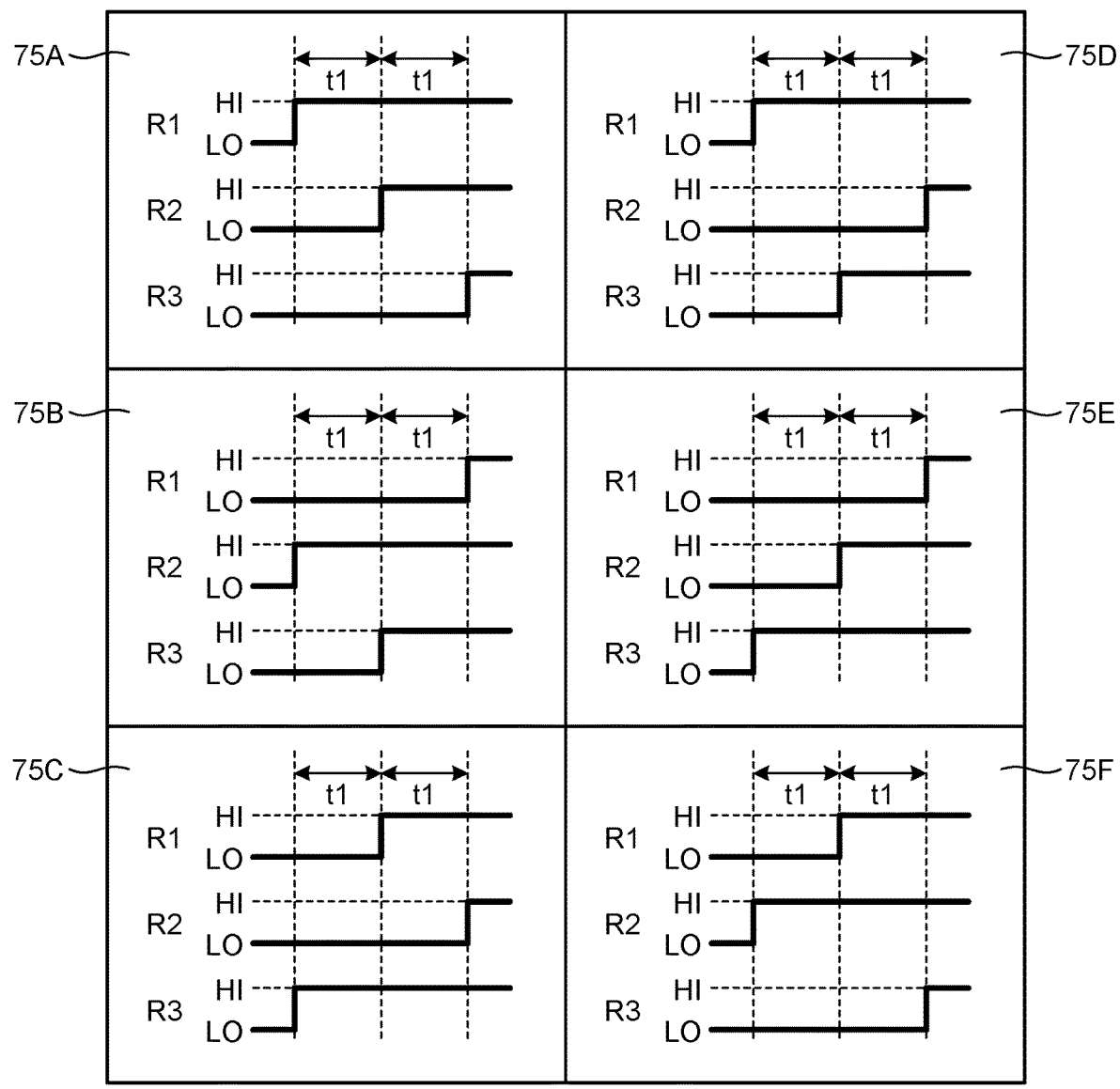
FIG. 8 is a diagram illustrating a list of the switching timings of signals output from the contact control unit of the motor driving device according to the first embodiment when switching the connection state from a star connection to a delta connection.

The contact control unit 4 performs such a process of changing a contact plate in which short-circuit current is to be generated in a distributed manner also in the case of switching the connection state from a star connection to a delta connection in a similar manner. FIG. 8 is a diagram illustrating a list of the switching timings of the signals output from the contact control unit of the motor driving device according to the first embodiment when switching the connection state from a star connection to a delta connection. FIG. 8 illustrates a list of the timing charts indicating the switching orders of the output values of the signals R1, R2, and R3 when the contact control unit 4 switches the connection state of the stator windings 61 to 63 from a star connection to a delta connection.

In a case when the connection state is switched from a star connection to a delta connection, there are six order patterns in which the output values of the signals R1, R2, and R3 are switched, i.e., timing charts 75A to 75F illustrated in FIG. 8. Each of the timing charts 75A to 75F indicates that, after the time difference t1 elapses from the time the output value of a signal is switched, the output value of the next signal is switched.

In the timing chart 75A, the output value of the signal R1, the output value of the signal R2, and the output value of the signal R3 are switched from LO to HI in that order. In the timing chart 75B, the output value of the signal R2, the output value of the signal R3, and the output value of the signal R1 are switched from LO to HI in that order. In the timing chart 75C, the output value of the signal R3, the output value of the signal R1, and the output value of the signal R2 are switched from LO to HI in that order. In the timing chart 75D, the output value of the signal R1, the output value of the signal R3, and the output value of the signal R2 are switched from LO to HI in that order. In the timing chart 75E, the output value of the signal R3, the output value of the signal R2, and the output value of the signal R1 are switched from LO to HI in that order. In the timing chart 75F, the output value of the signal R2, the output value of the signal R1, and the output value of the signal R3 are switched from LO to HI in that order.

Figure 9:
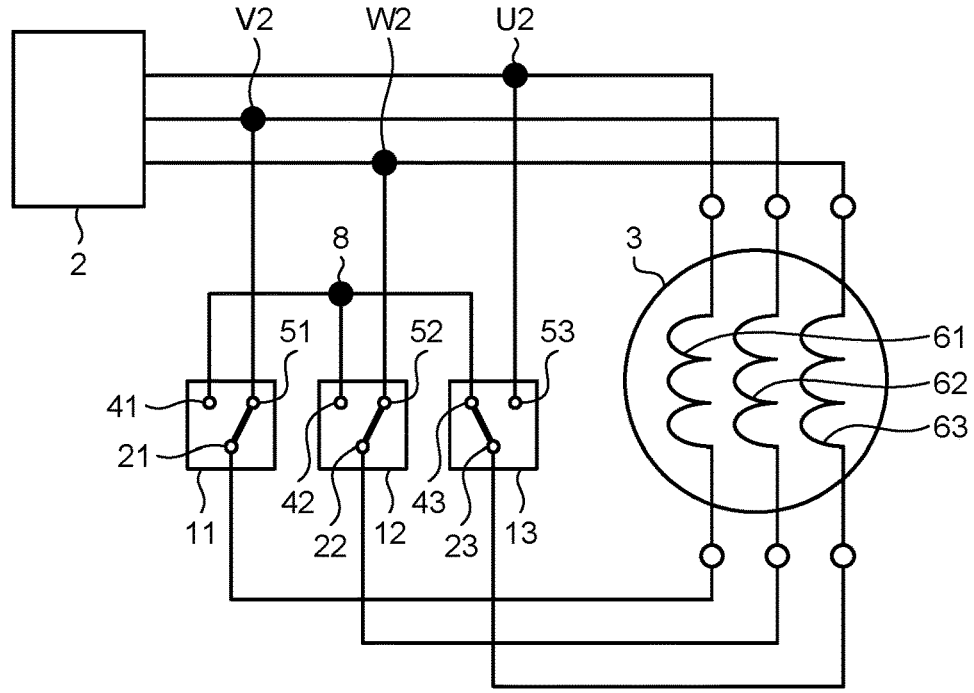
FIG. 9 is a diagram illustrating a first example of the connection state of the stator windings when the motor driving device according to the first embodiment switches the connection state from a star connection to a delta connection.
Figure 10:
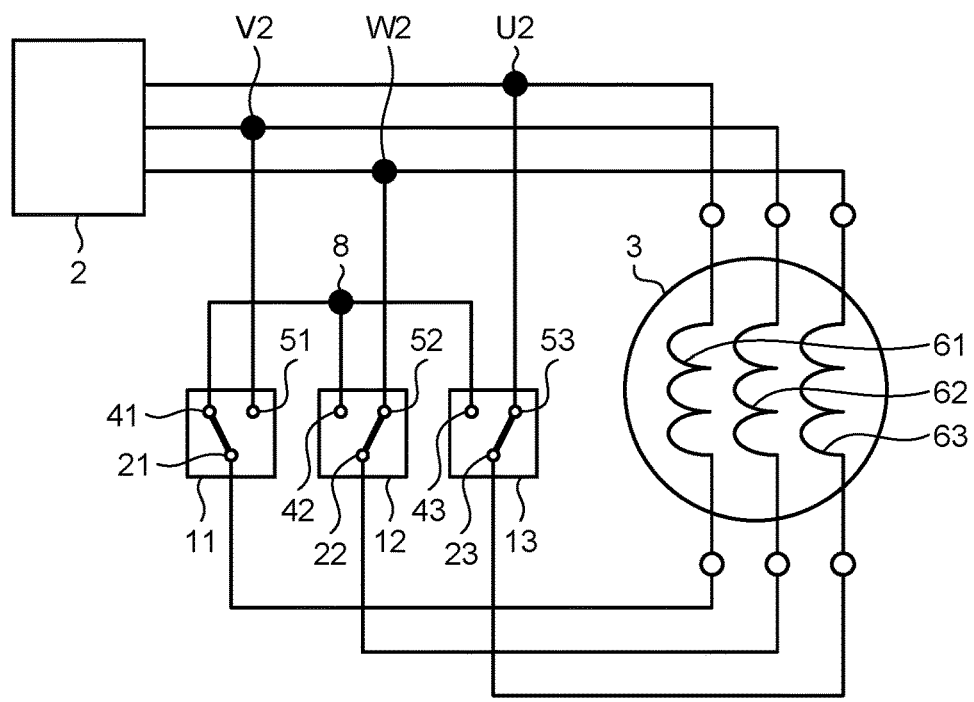
FIG. 10 is a diagram illustrating a second example of the connection state of the stator windings when the motor driving device according to the first embodiment switches the connection state from a star connection to a delta connection.
Figure 11:
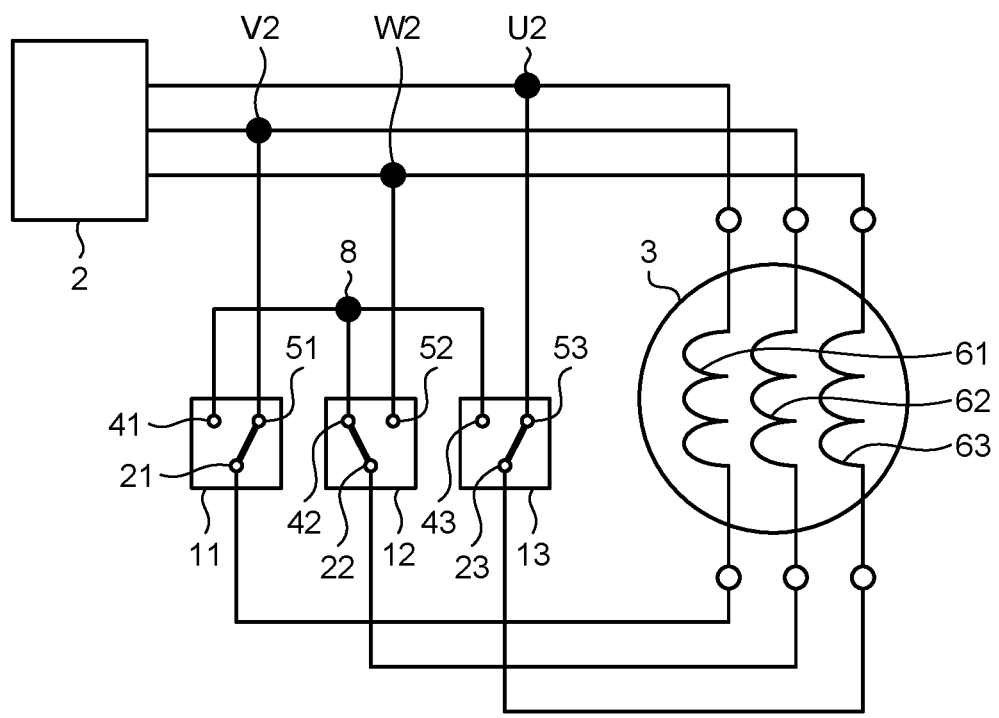
FIG. 11 is a diagram illustrating a third example of the connection state of the stator windings when the motor driving device according to the first embodiment switches the connection state from a star connection to a delta connection.

A description will be given here of an example of transition of the connection state of the stator windings 61 to 63 when the contact control unit 4 switches the output values of the signals R1, R2, and R3 to switch the connection state from a star connection to a delta connection. FIG. 9 is a diagram illustrating a first example of the connection state of the stator windings when the motor driving device according to the first embodiment switches the connection state from a star connection to a delta connection. FIG. 10 is a diagram illustrating a second example of the connection state of the stator windings when the motor driving device according to the first embodiment switches the connection state from a star connection to a delta connection. FIG. 11 is a diagram illustrating a third example of the connection state of the stator windings when the motor driving device according to the first embodiment switches the connection state from a star connection to a delta connection.

FIG. 9 illustrates the connection state between the second signal switching and the third signal switching in the timing chart 75A illustrated in FIG. 8. FIG. 10 illustrates the connection state between the second signal switching and the third signal switching in the timing chart 75B illustrated in FIG. 8. FIG. 11 illustrates the connection state between the second signal switching and the third signal switching in the timing chart 75C illustrated in FIG. 8. Note that FIGS. 9 to 11 illustrate the connection states after the contact plates have operated as a result of the second signal switching.

In the period between the second signal switching and the third signal switching in the timing charts 75A to 75C illustrated in FIG. 8, one of the stator windings 61 to 63 is open and a path for the winding current is lost; therefore, surge voltage is generated in addition to arc discharge. The arc discharge and surge voltage are transferred to the open contact plate.

In the case of the connection state illustrated in FIG. 9, arc discharge and surge voltage are generated in the relay 13. In the case of the connection state illustrated in FIG. 10, arc discharge and surge voltage are generated in the relay 11. In the case of the connection state illustrated in FIG. 11, arc discharge and surge voltage are generated in the relay 12.

Moreover, generation of arc discharge and surge voltage due to the transient connection state of the stator windings 61 to 63 between the first signal switching and the second signal switching can be distributed by the contact control unit 4 selecting each of the timing charts 75D to 75F. Arc discharge and surge voltage are generated in the relay 11 between the first signal switching and the second signal switching in the timing chart 75D. Arc discharge and surge voltage are generated in the relay 13 between the first signal switching and the second signal switching in the timing chart 75E. Arc discharge and surge voltage are generated in the relay 12 between the first signal switching and the second signal switching in the timing chart 75F.

In the first embodiment, the contact control unit 4 selects a different timing chart from among the timing charts 75A to 75F every time the connection state is switched from a star connection to a delta connection, so that the relay in which arc discharge and surge voltage are to be generated among the relays 11 to 13 can be changed in a distributed manner. The contact control unit 4 may select a different timing chart from among the timing charts 75A to 75C every time the connection state is switched. Alternatively, the contact control unit 4 may select a different timing chart from among the timing charts 75D to 75F every time the connection state is switched.

Surge voltage described above causes excessive voltage across each of the semiconductor elements configuring the inverter 2, which may cause a failure such as contact sticking in the inverter 2. Examples of the semiconductor elements configuring the inverter 2 include a semiconductor switching element and a semiconductor rectifier element. Examples of the semiconductor switching element include an insulated gate bipolar transistor (IGBT) and a metal-oxide-semiconductor field effect transistor (MOSFET). Examples of the semiconductor rectifier element include a single diode and a diode included in a MOSFET. According to the first embodiment, even when excessive voltage such as surge voltage is generated, surge voltage generated in each semiconductor element of the inverter 2 can be distributed to each semiconductor element.

Figure 12:
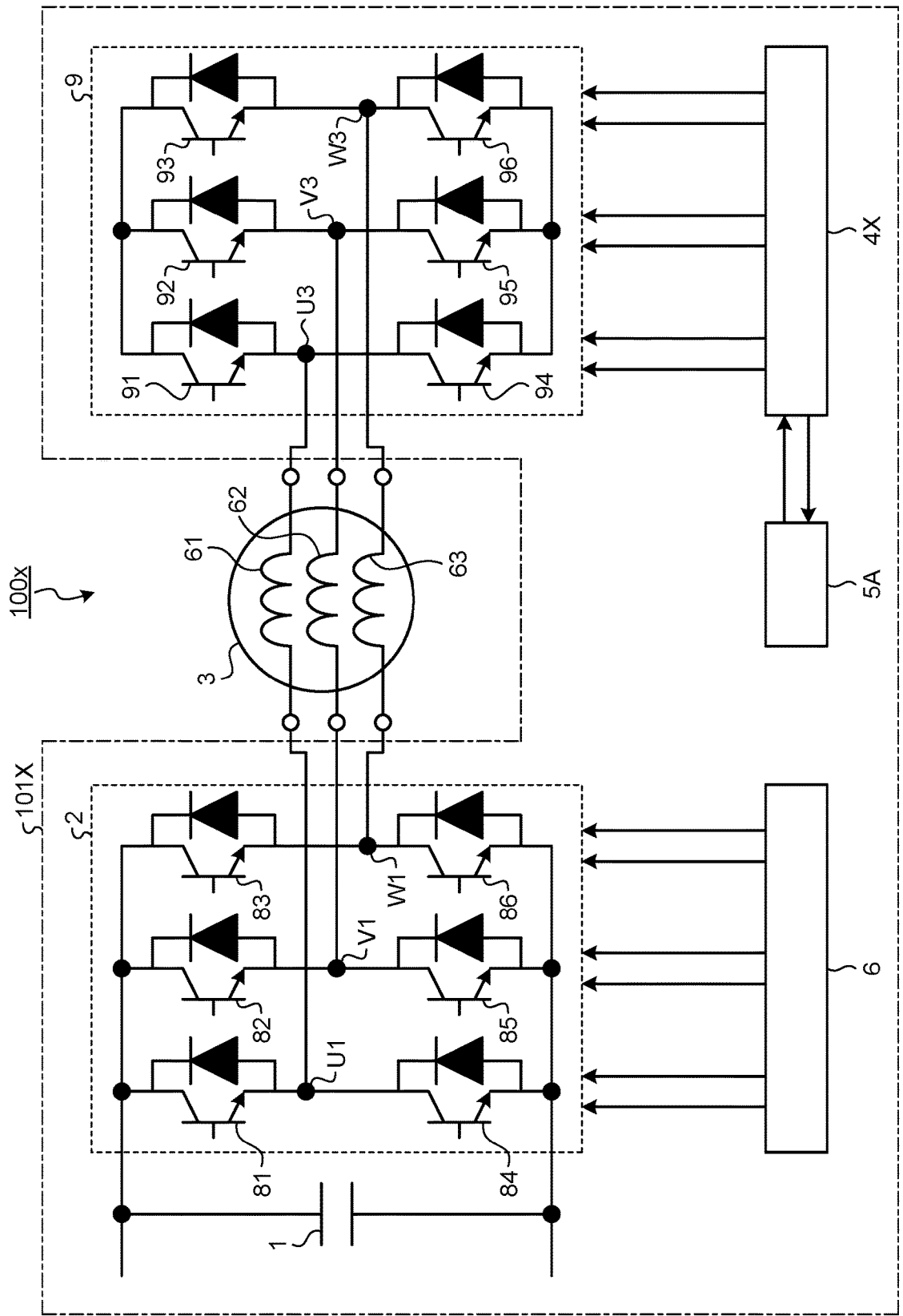
FIG. 12 is a diagram illustrating an exemplary configuration of a motor driving system in which a connection state switching unit in the motor driving device according to the first embodiment is configured from an inverter.

An inverter may be used instead of the relays 11, 12, and 13 in the connection state switching unit 10. FIG. 12 is a diagram illustrating an exemplary configuration of a motor driving system in which the connection state switching unit in the motor driving device according to the first embodiment is configured from an inverter.

A motor driving system 100x includes a motor driving device 101X and the motor 3. The motor driving device 101X includes the capacitor 1, the inverter 2, a contact control unit 4X, the control order storage unit 5A, the inverter control circuit 6, and an inverter 9. The inverter 9 has a configuration similar to that of the inverter 2 and implements the functions similar to those of the connection state switching unit 10.

The inverter 9 includes switching elements 91 to 96. The switching elements 91 to 93 form upper-arm switching elements and the switching elements 94 to 96 form lower-arm switching elements. The switching elements 91 and 94 are connected in series, the switching elements 92 and 95 are connected in series, and the switching elements 93 and 96 are connected in series.

A connection point U3 between the switching element 91 and the switching element 94 is drawn out of the inverter 9 and is connected to one end of the stator winding 61. A connection point V3 between the switching element 92 and the switching element 95 is drawn out of the inverter 9 and is connected to one end of the stator winding 62. A connection point W3 between the switching element 93 and the switching element 96 is drawn out of the inverter 9 and is connected to one end of the stator winding 63.

When the inverter 9 is used instead of the connection state switching unit 10, the connection point U1 of the inverter 2 is drawn out of the inverter 2 and is connected to the other end of the stator winding 61. Moreover, the connection point V1 of the inverter 2 is drawn out of the inverter 2 and is connected to the other end of the stator winding 62, and the connection point W1 of the inverter 2 is drawn out of the inverter 2 and is connected to the other end of the stator winding 63.

When the inverter 9 is used, the contact control unit 4X sequentially switches the output values of the signals output to the switching elements 91 to 96 such that the output values of the signals are switched at different timings from one another in the switching elements 91 to 96. Moreover, the contact control unit 4X changes the switching order, which is the order in which the output values of the signals are switched, every time the connection state is switched.

Even when the inverter 9 is used instead of the connection state switching unit 10 as described above, the motor driving device 101X can still achieve an effect similar to that of the motor driving device 101A on the generation of arc discharge and surge voltage, by sequentially using the timing charts 80A to 80F illustrated in FIG. 3 or the timing charts 75A to 75F illustrated in FIG. 8.

Figure 13:
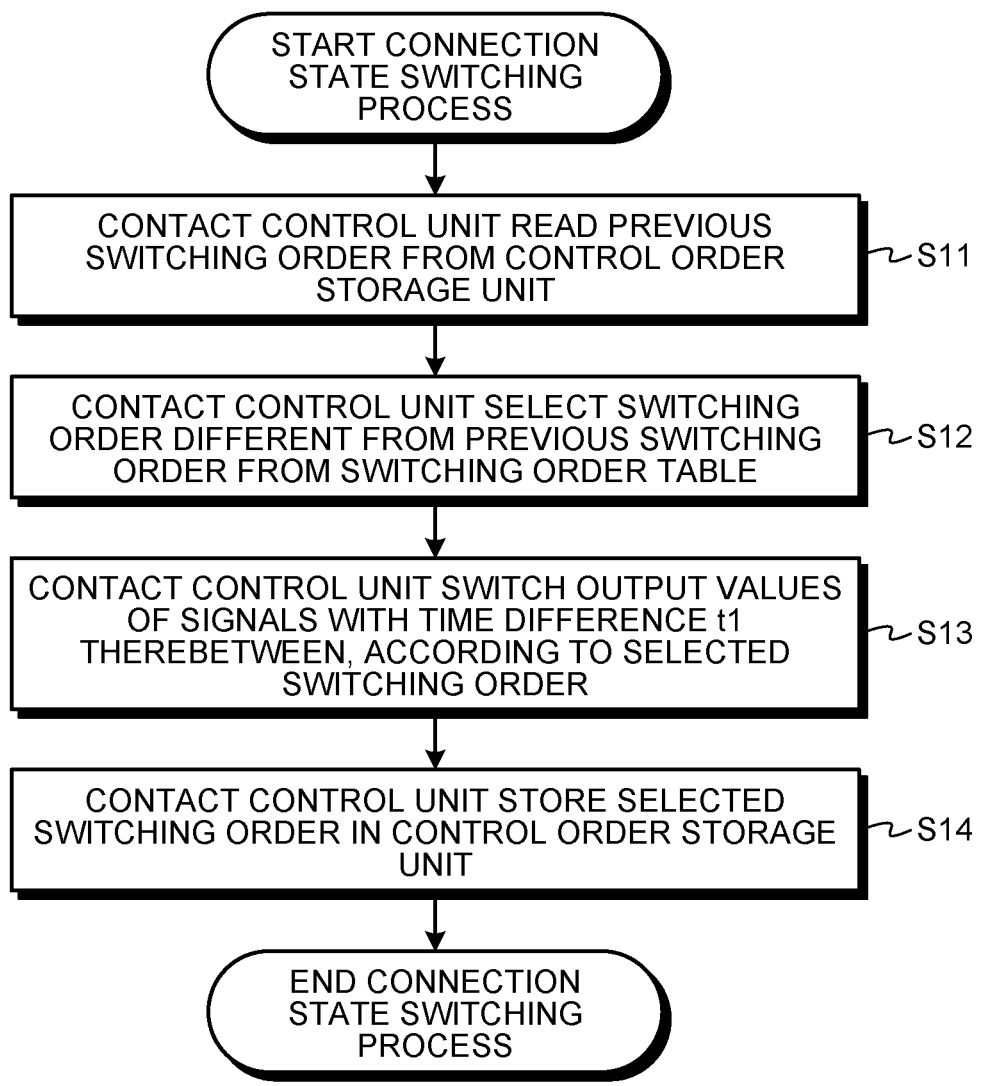
FIG. 13 is a flowchart illustrating a processing procedure of the process of switching the connection state performed by the motor driving device according to the first embodiment.

FIG. 13 is a flowchart illustrating a processing procedure of the process of switching the connection state performed by the motor driving device according to the first embodiment. The contact control unit 4 performs a similar process in a case of switching the connection state from a delta connection to a star connection and in a case of switching the connection state from a star connection to a delta connection; therefore, a description will be given here of a process in a case when the contact control unit 4 switches the connection state from a delta connection to a star connection.

The contact control unit 4 reads the previous switching order from the control order storage unit 5A (step S11). The contact control unit 4 selects a switching order that is different from the previous switching order from the switching order table 800 illustrated in FIG. 4 (step S12).

The contact control unit 4 switches the output values of the signals with the time difference t1 therebetween, according to the selected switching order (step S13). The contact control unit 4 stores the selected switching order in the control order storage unit 5A (step S14).

In such a manner, the contact control unit 4 stores the switching order selected from the switching order table 800 in the control order storage unit 5A and reads the switching order from the control order storage unit 5A when the next connection state switching is performed; therefore, the contact control unit 4 can select a different switching order every time the connection state is switched.

As described above, the motor driving device 101A according to the first embodiment includes the contact control unit 4 that switches the order in which to supply power to the coils 31 to 33 of the relays 11 to 13; therefore, a failure can be prevented or inhibited from occurring exclusively in a specific relay. This prevents or inhibits a specific relay from having a high probability of failure, and the life of the relays 11 to 13 as a whole can be extended. Therefore, the reliability of the operation of the motor 3 can be improved.

Second Embodiment

A description will be given next of a second embodiment of this invention with reference to FIG. 14 and FIG. 15. In the second embodiment, the order in which to select the switching orders Ax to Fx is preset and a motor driving device sequentially selects the switching orders Ax to Fx according to the preset order.

Figure 14:
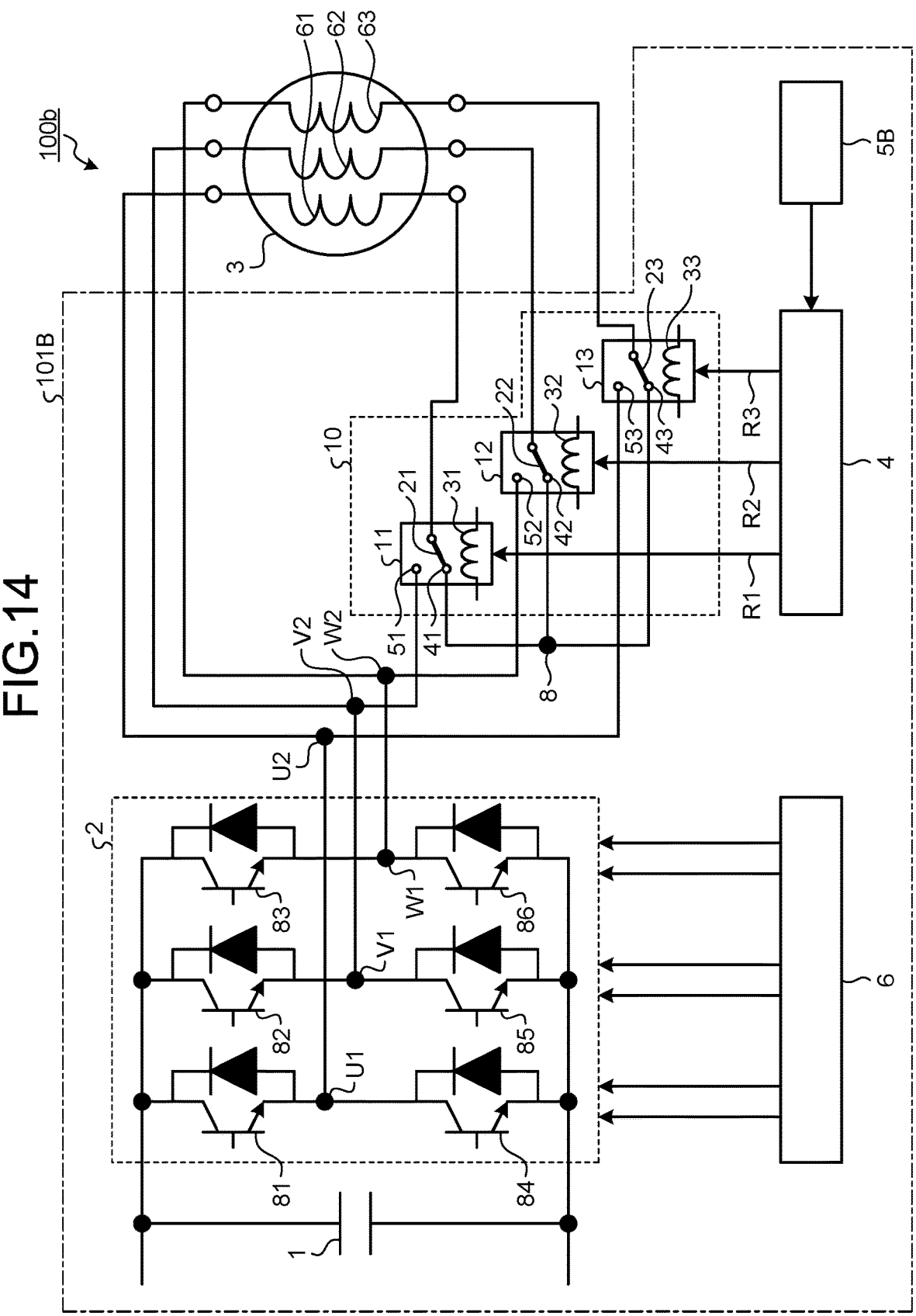
FIG. 14 is a diagram illustrating an exemplary configuration of a motor driving system that includes a motor driving device according to a second embodiment.
Figure 15:
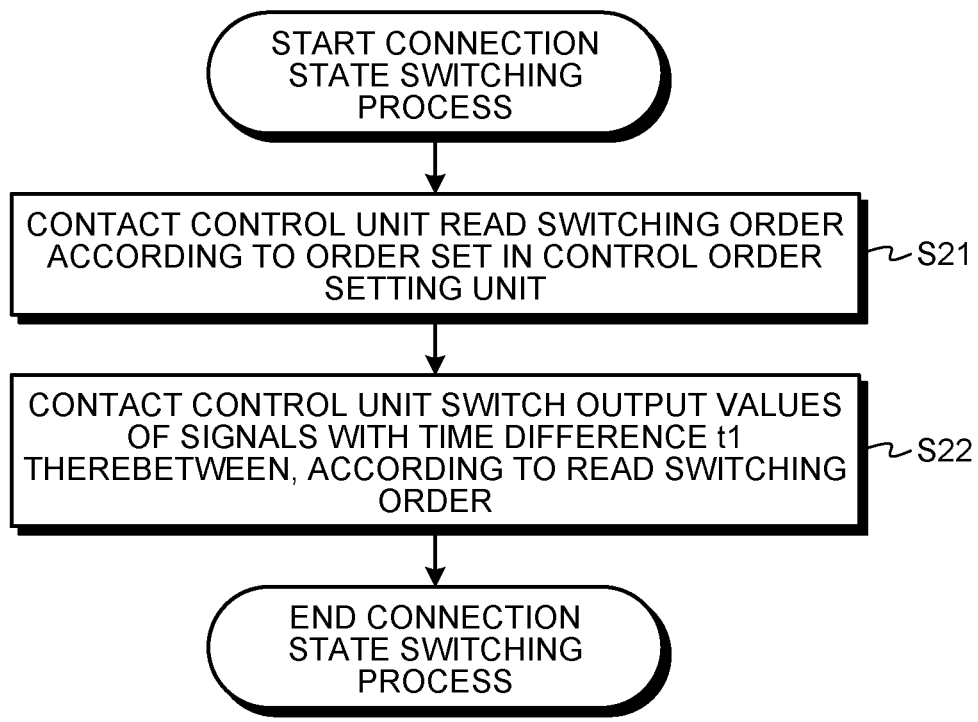
FIG. 15 is a flowchart illustrating a processing procedure of the process of switching the connection state performed by the motor driving device according to the second embodiment.

FIG. 14 is a diagram illustrating an exemplary configuration of a motor driving system that includes a motor driving device according to the second embodiment. Components illustrated in FIG. 14 that achieve the same functions as those of the motor driving system 100a in the first embodiment illustrated in FIG. 1 are denoted by the same reference signs, and duplicate descriptions will be omitted.

A motor driving system 100b according to the second embodiment includes a motor driving device 101B and the motor 3. The motor driving device 101B according to the second embodiment is different from the motor driving device 101A in that the motor driving device 101B includes a control order setting unit 5B in place of the control order storage unit 5A.

The order in which to select the six switching orders stored in the switching order table 800 illustrated in FIG. 4 is set in the control order setting unit 5B. For example, information (hereinafter, referred to as selection order information) for causing the contact control unit 4 to sequentially select the switching order Ax, the switching order Bx, the switching order Cx, the switching order Dx, the switching order Ex, and the switching order Fx in that order is set in the control order setting unit 5B. The control order setting unit 5B is, for example, a memory.

The contact control unit 4 sequentially selects the switching orders in the switching order table 800 according to the order set in the selection order information in the control order setting unit 5B. For example, if the switching order Ax is set to be selected in the first selection in the selection order information, the contact control unit 4 reads the switching order Ax from the switching order table 800 in the first selection. The contact control unit 4 switches the output value of each of the signals R1 to R3 according to the read switching order.

Hereinafter, the operation of the motor driving device 101B will be described. In the second embodiment, the operation different from that of the motor driving device 101A according to the first embodiment will be described. FIG. 15 is a flowchart illustrating a processing procedure of the process of switching the connection state performed by the motor driving device according to the second embodiment. The contact control unit 4 performs a similar process in a case of switching the connection state from a delta connection to a star connection and in a case of switching the connection state from a star connection to a delta connection; therefore, a description will be given here of a process in a case when the contact control unit 4 switches the connection state from a delta connection to a star connection.

The contact control unit 4 reads a switching order from the switching order table 800 according to the order set in the selection order information in the control order setting unit 5B (step S21). The contact control unit 4 switches the output values of the signals with the time difference t1 therebetween, according to the read switching order (step S22).

In such a manner, the order in which to select the six switching orders stored in the switching order table 800 is preset in the selection order information in the control order setting unit 5B, and the contact control unit 4 reads a switching order from the switching order table 800 according to the order set in the selection order information.

In the selection order information, when the order in which to select the switching orders is set such that the number of times each of the switching orders Ax to Fx is selected is equalized, the number of generations of short-circuit current, arc discharge, and surge voltage in each of the relays 11, 12, and 13 is also equalized.

As described above, for example, in a case when the order in which to select the switching order Ax, the switching order Bx, the switching order Cx, the switching order Dx, the switching order Ex, and the switching order Fx is set in the selection order information, if the contact control unit 4 switches the connection state 6N (N is a natural number) times, the number of generations of short-circuit current, arc discharge, and surge voltage in each of the relays 11, 12, and 13 is equalized.

As described above, in the motor driving device 101B according to the second embodiment, the order in which to select the switching orders Ax to Fx (selection order information) is set in the control order setting unit 5B. The contact control unit 4 selects the switching orders Ax to Fx according to the selection order information, so that the number of generations of short-circuit current or the like in each of the relays 11, 12, and 13 can be equalized. Therefore, the probability of failure that occurs in each of the relays 11, 12, and 13 can be equalized.

Third Embodiment

A description will be given next of a third embodiment of this invention with reference to FIG. 16 and FIG. 17. In the third embodiment, a motor driving device detects currents flowing in the stator windings 61 to 63 and selects, from among the switching orders Ax to Fx in the switching order table 800, a switching order that reduces short-circuit current generated in the contact plates 21 to 23 based on the currents detected.

Figure 16:
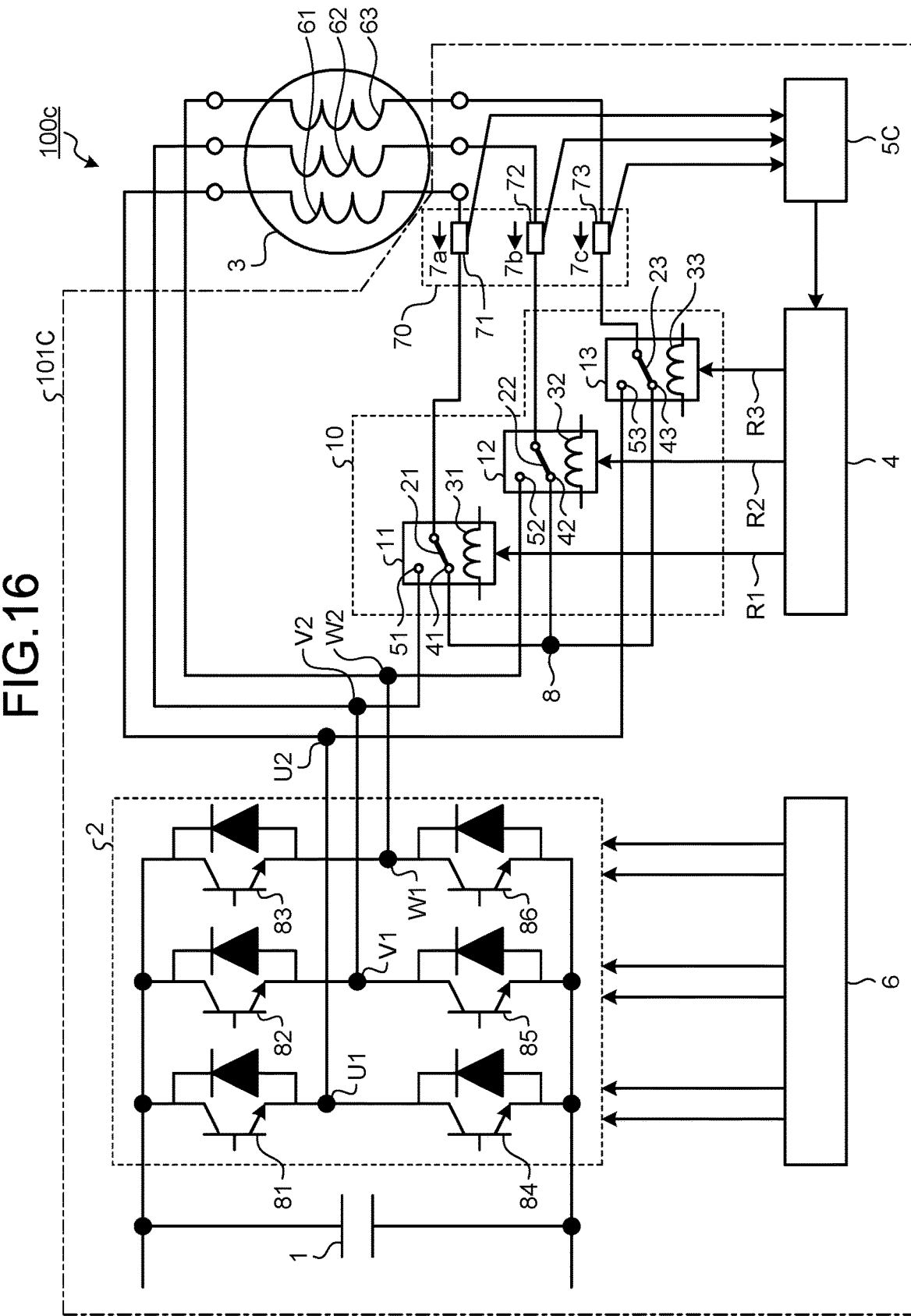
FIG. 16 is a diagram illustrating an exemplary configuration of a motor driving system that includes a motor driving device according to a third embodiment.
Figure 17:
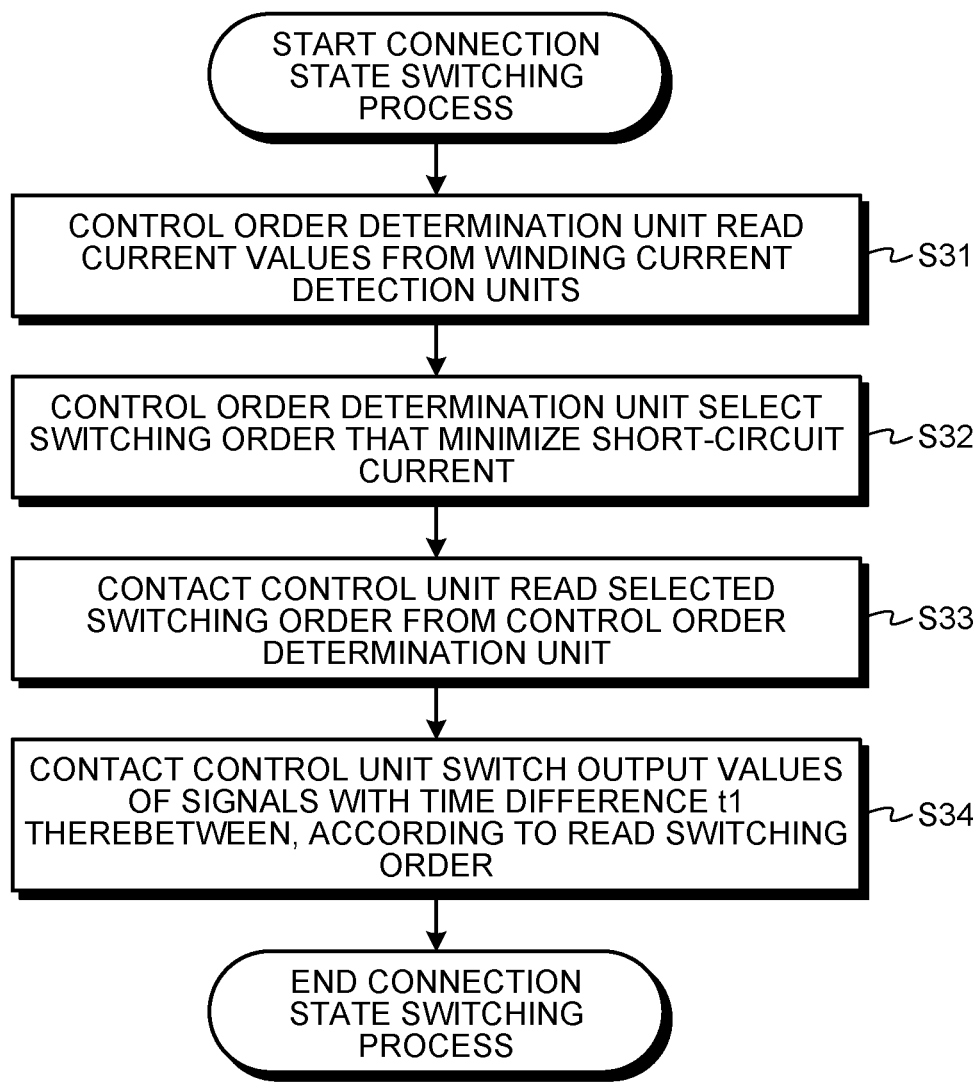
FIG. 17 is a flowchart illustrating a processing procedure of the process of switching the connection state performed by the motor driving device according to the third embodiment.

FIG. 16 is a diagram illustrating an exemplary configuration of a motor driving system that includes a motor driving device according to the third embodiment. Components illustrated in FIG. 16 that achieve the same functions as those of the motor driving system 100a in the first embodiment illustrated in FIG. 1 are denoted by the same reference signs, and duplicate descriptions will be omitted.

A motor driving system 100c according to the third embodiment includes a motor driving device 101C and the motor 3. The motor driving device 101C according to the third embodiment is different from the motor driving device 101A in that the motor driving device 101C includes a control order determination unit 5C in place of the control order storage unit 5A. Moreover, the motor driving device 101C includes a current detection device 70.

The current detection device 70 is a device that detects currents flowing in the stator windings 61, 62, and 63 and includes winding current detection units 71 to 73. The winding current detection unit 71 is disposed on the wire between one end of the stator winding 61 and the contact plate 21, the winding current detection unit 72 is disposed on the wire between one end of the stator winding 62 and the contact plate 22, and the winding current detection unit 73 is disposed on the wire between one end of the stator winding 63 and the contact plate 23.

The winding current detection unit 71 detects a current value of a winding current 7a flowing in the stator winding 61 and sends the detection result to the control order determination unit 5C. The winding current detection unit 72 detects a current value of a winding current 7b flowing in the stator winding 62 and sends the detection result to the control order determination unit 5C. The winding current detection unit 73 detects a current value of a winding current 7c flowing in the stator winding 63 and sends the current value of the detection result to the control order determination unit 5C.

The control order determination unit 5C selects and determines, based on the current values detected by the winding current detection units 71 to 73, a switching order that reduces short-circuit current generated in the contact plates 21, 22, and 23, from among the six switching orders Ax to Fx in the switching order table 800.

Hereinafter, the operation of the motor driving device 101C will be described. In the third embodiment, the operation different from that of the motor driving device 101A according to the first embodiment will be described. FIG. 17 is a flowchart illustrating a processing procedure of the process of switching the connection state performed by the motor driving device according to the third embodiment. The contact control unit 4 performs a similar process in a case of switching the connection state from a delta connection to a star connection and in a case of switching the connection state from a star connection to a delta connection; therefore, a description will be given here of a process in a case when the contact control unit 4 switches the connection state from a delta connection to a star connection.

When the winding current detection units 71 to 73 detect current values of the winding currents 7a, 7b, and 7c, the control order determination unit 5C reads the current values from the current detection device 70 (step S31).

The control order determination unit 5C selects, from the switching order table 800, a switching order that minimizes short-circuit current generated in the contact plates 21, 22, and 23 based on the current values detected by the winding current detection units 71 to 73 (step S32).

The contact control unit 4 reads the selected switching order from the control order determination unit 5C (step S33). The contact control unit 4 switches the output values of the signals with the time difference t1 therebetween, according to the read switching order (step S34).

For example, in a case when the connection state of the stator windings 61 to 63 is switched from a delta connection to a star connection, if the short-circuit current in the connection state illustrated in FIG. 5 among the connection states illustrated in FIG. 5 to FIG. 7 is smaller than the short-circuit current in each of the connection states illustrated in FIG. 6 and FIG. 7, the control order determination unit 5C selects the timing chart 80A (switching order Ax) corresponding to the connection state illustrated in FIG. 5. That is, when the current value of the winding current 7c is smaller than the current values of the winding currents 7a and 7b, the current of arc discharge is smaller when arc discharge is generated in the relay 13 in the connection state illustrated in FIG. 5 than when arc discharge is generated in the relay 11 or the relay 12 in the connection state illustrated in FIG. 6 or FIG. 7; therefore, the control order determination unit 5C selects the timing chart 80A.

As described above, in the motor driving device 101C according to the third embodiment, the winding current detection units 71 to 73 detect current values of the winding currents 7a, 7b, and 7c flowing in the stator windings 61 to 63, and the control order determination unit 5C determines the switching order that reduces short-circuit current generated in the contact plates 21 to 23 based on the current values detected. Therefore, the probability of failure of the relays 11 to 13 can be reduced.

Fourth Embodiment

A description will be given next of a fourth embodiment of this invention with reference to FIG. 18 and FIG. 19. In the fourth embodiment, a motor driving device 101D performs an operation of switching the connection state of the stator windings 61 to 63 after controlling the switching elements 81 to 86 such that currents flowing in the semiconductor elements configuring the inverter 2 and the stator windings 61 to 63 of the motor 3 are small.

Figure 18:
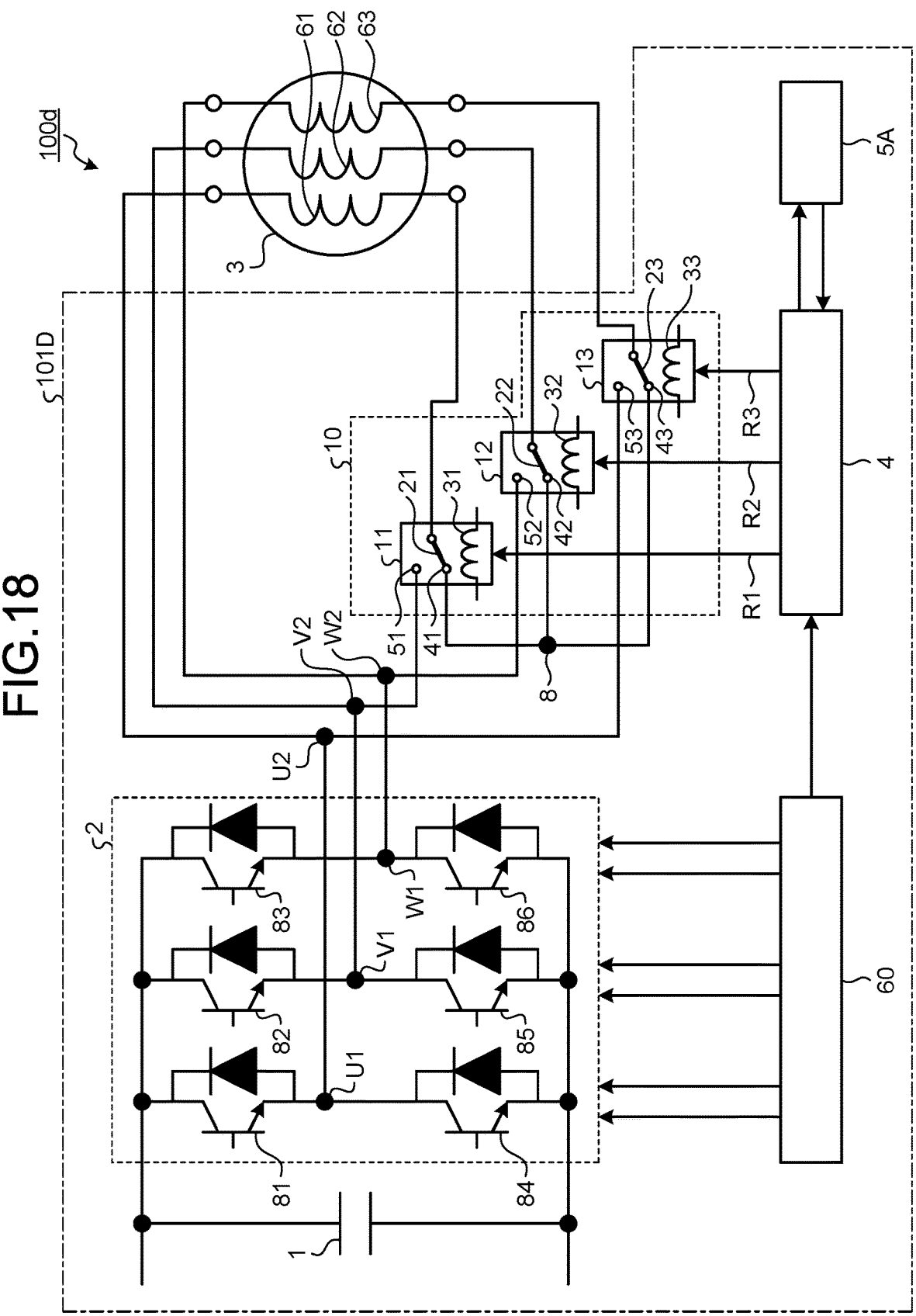
FIG. 18 is a diagram illustrating an exemplary configuration of a motor driving system that includes a motor driving device according to a fourth embodiment.
Figure 19:
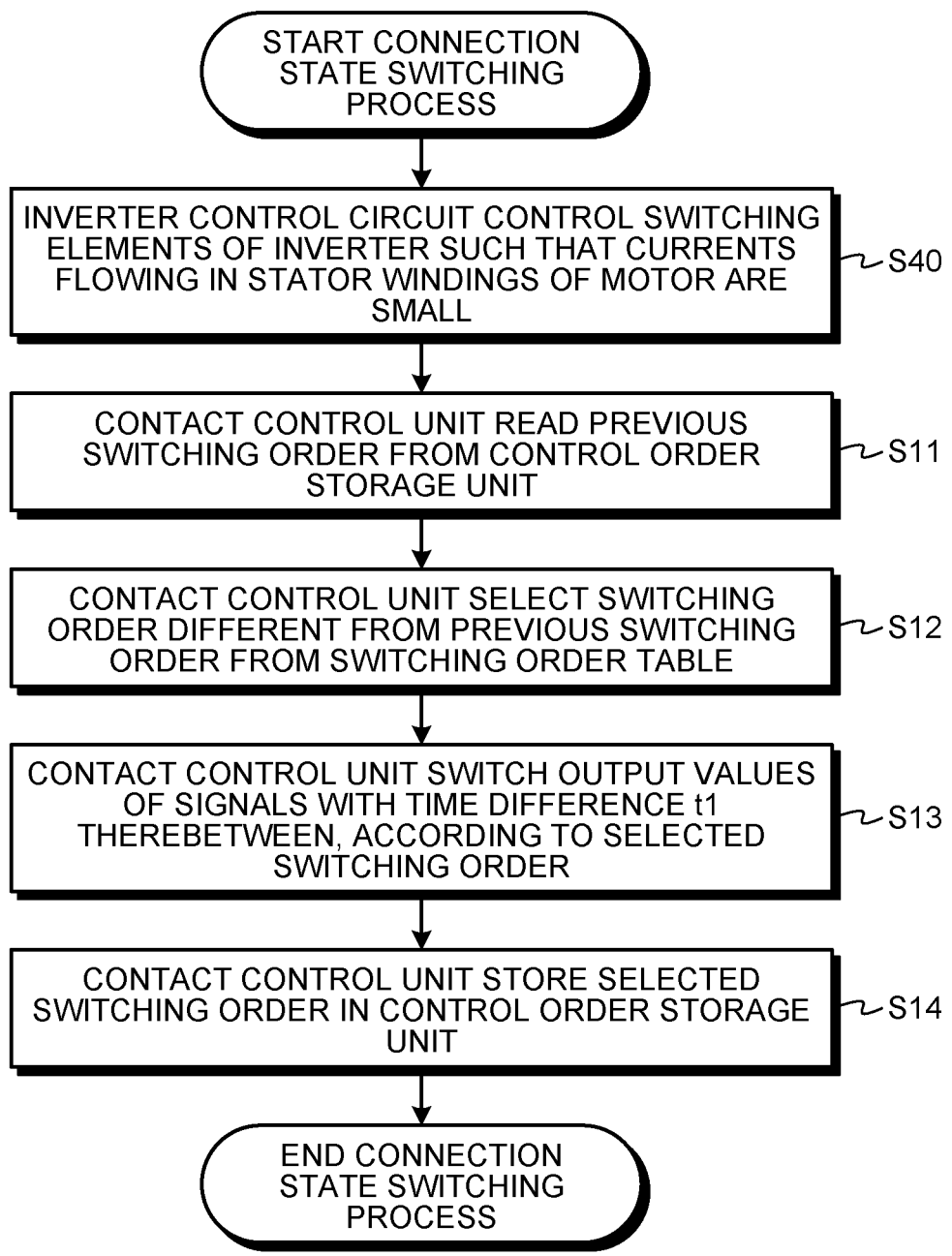
FIG. 19 is a flowchart illustrating a processing procedure of the process of switching the connection state performed by the motor driving device according to the fourth embodiment.

FIG. 18 is a diagram illustrating an exemplary configuration of a motor driving system that includes a motor driving device according to the fourth embodiment. Components illustrated in FIG. 18 that achieve the same functions as those of the motor driving system 100a in the first embodiment illustrated in FIG. 1 are denoted by the same reference signs, and duplicate descriptions will be omitted.

A motor driving system 100d according to the fourth embodiment includes the motor driving device 101D and the motor 3. The motor driving device 101D according to the fourth embodiment is different from the motor driving device 101A in that the motor driving device 101D includes an inverter control circuit 60 in place of the inverter control circuit 6.

The inverter control circuit 60 controls the switching elements 81 to 86 such that the current values of the currents flowing in the semiconductor elements configuring the inverter 2 and the stator windings 61 to 63 of the motor 3 when the connection state is switched are smaller than those at the timing when the connection state is not switched. The inverter control circuit 60 can reduce the currents flowing in the stator windings 61 to 63 by equalizing the voltages output from the connection points U1 to W1. The inverter control circuit 60 notifies the contact control unit 4 of the timing at which the currents flowing in the semiconductor elements configuring the inverter 2 and the stator windings 61 to 63 of the motor 3 are small. Upon receiving the notification from the inverter control circuit 60, the contact control unit 4 according to the fourth embodiment switches the connection state of the stator windings 61 to 63.

Hereinafter, the operation of the motor driving device 101D will be described. In the fourth embodiment, the operation different from that of the motor driving device 101A according to the first embodiment will be described. FIG. 19 is a flowchart illustrating a processing procedure of the process of switching the connection state performed by the motor driving device according to the fourth embodiment. The motor driving device 101D performs a similar process in a case of switching the connection state from a delta connection to a star connection and in a case of switching the connection state from a star connection to a delta connection; therefore, a description will be given here of a process in a case when the contact control unit 4 switches the connection state from a delta connection to a star connection.

Before the contact control unit 4 switches the connection state of the stator windings 61 to 63, the inverter control circuit 60 controls the switching elements 81 to 86 such that the currents flowing in the semiconductor elements configuring the inverter 2 and the stator windings 61 to 63 of the motor 3 are small (step S40). Specifically, the inverter control circuit 60 controls the switching elements 81 to 86 such that the currents flowing in the stator windings 61 to 63 are smaller than those at the timing when the connection state is not switched. With this control, the currents flowing in the contact plates 21, 22, and 23 also become small.

The inverter control circuit 60 notifies the contact control unit 4 of the timing at which the currents flowing in the semiconductor elements configuring the inverter 2 and the stator windings 61 to 63 of the motor 3 are small. Upon receiving the notification from the inverter control circuit 60, the contact control unit 4 switches the connection state of the stator windings 61 to 63. Specifically, the contact control unit 4 performs the processes at steps S11 to S14 described in the first embodiment.

In such a manner, when the currents flowing in the semiconductor elements configuring the inverter 2 and the stator windings 61 to 63 of the motor 3 have become small, the contact control unit 4 switches the connection state of the stator windings 61 to 63. Consequently, the short-circuit current generated in the contact plates 21, 22, and 23 also becomes small and thus the effect of arc discharge and surge voltage can be reduced.

When the connection state is switched, the inverter control circuit 60 may control the inverter 2 based on the direct current flowing in the capacitor 1 and the contact control unit 4 may control the process of switching the connection state of the stator windings 61 to 63 based on the current value of the direct current flowing in the capacitor 1. In such a case, the motor driving device 101D detects the current value of the direct current between the capacitor 1 and the inverter 2. The inverter control circuit 60 controls the inverter 2 such that the currents flowing in the stator windings 61 to 63 are small, and when the current value detected between the capacitor 1 and the inverter 2 becomes smaller than a reference value of the direct current, the contact control unit 4 and the inverter control circuit 60 perform the process described with reference to FIG. 19.

When the connection state is switched, the inverter control circuit 60 may control the inverter 2 based on the alternating current flowing in the output terminal of the inverter 2 and the contact control unit 4 may control the process of switching the connection state of the stator windings 61 to 63 based on the alternating current flowing in the output terminal of the inverter 2. In such a case, the motor driving device 101D detects the current values of the alternating currents between the connection point U1 and the connection point U2, between the connection point V1 and the connection point V2, and between the connection point W1 and the connection point W2. The inverter control circuit 60 controls the inverter 2 such that the currents flowing in the stator windings 61 to 63 are small, and when the detected current values become smaller than a reference value of the alternating current, the contact control unit 4 and the inverter control circuit 60 perform the process described with reference to FIG. 19.

Further, the motor driving device 101D may include the control order setting unit 5B described in the second embodiment instead of the control order storage unit 5A. Further, the motor driving device 101D may include the control order determination unit 5C described in the third embodiment instead of the control order storage unit 5A and further include the current detection device 70.

When the motor driving device 101D includes the current detection device 70, the current detection device 70 can directly detect the currents flowing in the contact plates 21, 22, and 23. Consequently, the contact control unit 4 can switch the connection state of the stator windings 61 to 63 at the timing at which the currents actually detected by the current detection device 70 become smaller than the reference value.

As described above, in the motor driving device 101D according to the fourth embodiment, when the connection state is switched, the inverter control circuit 60 controls the switching elements 81 to 86 such that the currents flowing in the semiconductor elements configuring the inverter 2 and the stator windings 61 to 63 of the motor 3 are small. When the currents flowing in the semiconductor elements configuring the inverter 2 and the stator windings 61 to 63 of the motor 3 have become small, the contact control unit 4 switches the connection state of the stator windings 61 to 63. Consequently, the short-circuit current generated in the contact plates 21, 22, and 23 becomes small and the effect of arc discharge and surge voltage can be reduced.

Fifth Embodiment

A description will be given next of a fifth embodiment of this invention with reference to FIG. 20 to FIG. 22. In the fifth embodiment, any of the motor driving systems 100a to 100d and 100x is applied to a refrigeration cycle apparatus.

Figure 20:
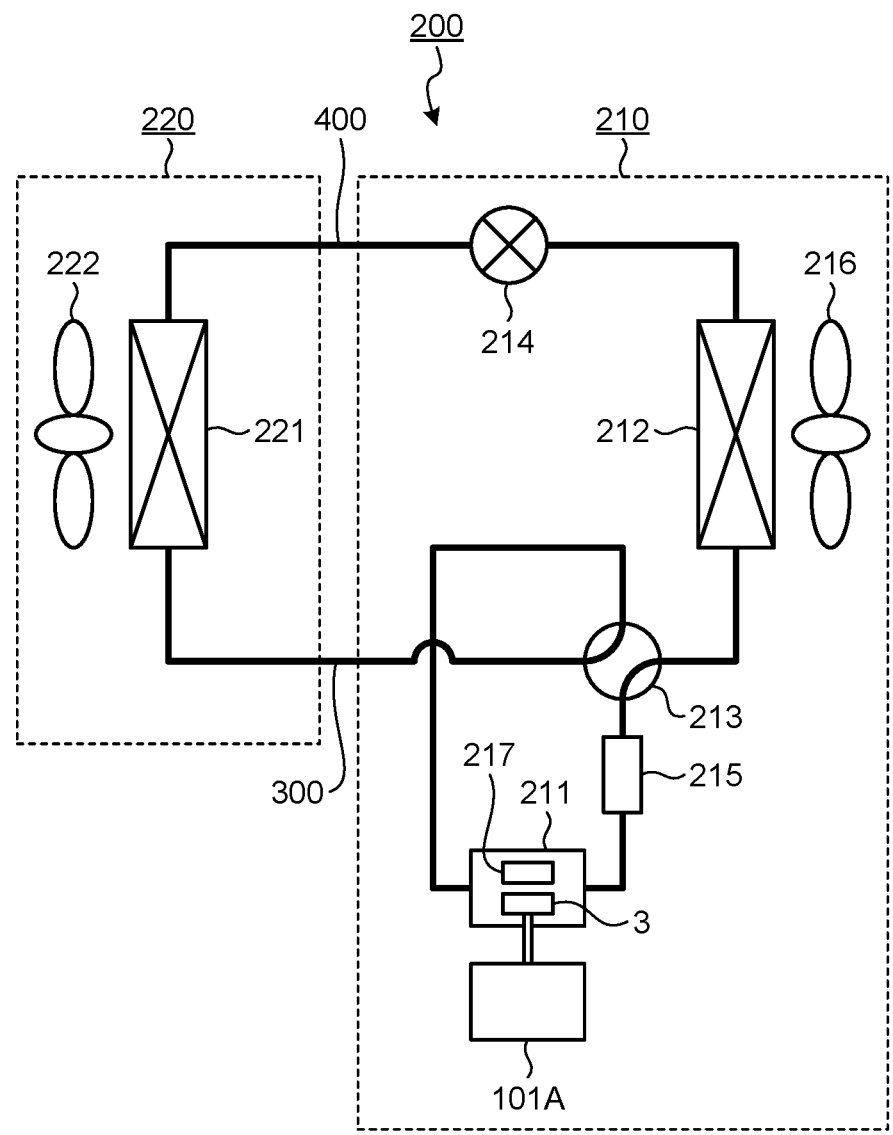
FIG. 20 is a diagram illustrating an exemplary configuration of a refrigeration cycle apparatus according to a fifth embodiment.
Figure 21:
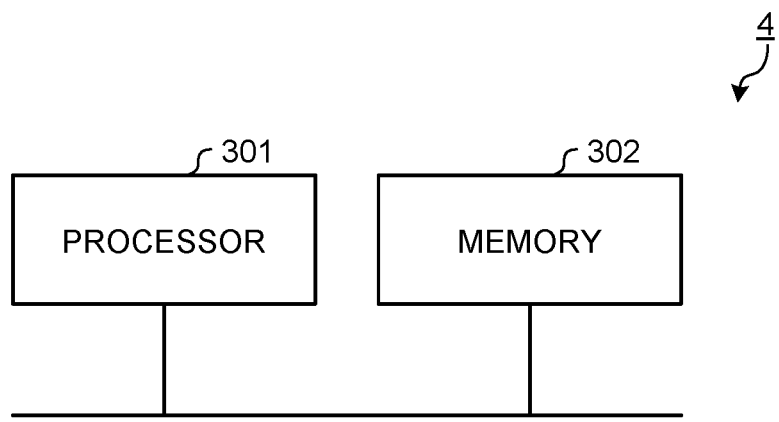
FIG. 21 is a diagram illustrating a first example of a hardware configuration of the contact control units of the motor driving devices according to the first to fourth embodiments.

FIG. 20 is a diagram illustrating an exemplary configuration of a refrigeration cycle apparatus according to the fifth embodiment. A refrigeration cycle apparatus 200 is an apparatus that transfers heat between the outside air and the indoor air via refrigerant to heat or cool the room, thereby performing air conditioning.

The refrigeration cycle apparatus 200 according to the fifth embodiment includes an outdoor unit 210 and an indoor unit 220. The outdoor unit 210 includes any one of the motor driving devices 101A, 101X, 101B, 101C, and 101D described in the first to fourth embodiments. A description will be given here of a case where the outdoor unit 210 includes the motor driving device 101A.

The outdoor unit 210 includes the motor driving device 101A, a compressor 211, an outdoor-side heat exchanger 212, a four-way valve 213, a decompression unit 214, a refrigerant accumulation unit 215, and a fan 216. The compressor 211 includes a compression mechanism 217 that compresses the refrigerant and the motor 3 that operates the compression mechanism 217. The indoor unit 220 includes a load-side heat exchanger 221 and a fan 222.

In the refrigeration cycle apparatus 200, the outdoor unit 210 and the indoor unit 220 are connected by a refrigerant pipe to configure a refrigerant circuit in which the refrigerant circulates. The refrigerant pipe includes a gas pipe 300 through which gas-phase refrigerant flows and a liquid pipe 400 through which liquid-phase refrigerant flows. Note that gas-liquid two-phase refrigerant may flow through the liquid pipe 400.

The compression mechanism 217 compresses the refrigerant admitted therein and discharges the refrigerant compressed. The refrigerant accumulation unit 215 accumulates the refrigerant. The four-way valve 213 switches the flow of the refrigerant between the cooling operation and the heating operation, in accordance with an instruction from a control device (not illustrated).

The outdoor-side heat exchanger 212 exchanges heat between the refrigerant and the outdoor air. During the heating operation, the outdoor-side heat exchanger 212 functions as an evaporator and exchanges heat between the low-pressure refrigerant having entered through the liquid pipe 400 and the outdoor air to evaporate and gasify the refrigerant. During the cooling operation, the outdoor-side heat exchanger 212 functions as a condenser and exchanges heat between the refrigerant having been compressed in the compression mechanism 217 and having entered from the side of the four-way valve 213 and the outdoor air, to condense and liquefy the refrigerant.

The outdoor-side heat exchanger 212 is provided with the fan 216 to increase the efficiency of the heat exchange between the refrigerant and the outdoor air. The decompression unit 214 adjusts the pressure of the refrigerant by changing the size of the opening.

The load-side heat exchanger 221 exchanges heat between the refrigerant and the indoor air. During the heating operation, the load-side heat exchanger 221 functions as a condenser and exchanges heat between the refrigerant having entered through the gas pipe 300 and the indoor air to condense and liquefy the refrigerant and then permit the refrigerant to flow toward the liquid pipe 400. During the cooling operation, the load-side heat exchanger 221 functions as an evaporator and exchanges heat between the refrigerant decompressed by the decompression unit 214 and the indoor air to cause the refrigerant to remove the heat of the air and evaporate the refrigerant and then permit the refrigerant to flow toward the gas pipe 300. The fan 222 adjusts the flow of the air with which the load-side heat exchanger 221 performs heat exchange.

The refrigeration cycle apparatus 200 determines the operation mode and the heat exchange amount needed in the refrigeration cycle according to the user's operation, with a remote control (not illustrated) or the like. At this time, according to the operation with a remote control, the outdoor unit 210 determines the rotation speed of the compression mechanism 217, the operation of the four-way valve 213, and the rotation speed of the fan 216, and the indoor unit 220 determines the rotation speed of the fan 222. The motor driving device 101A determines the rotation speed of the compression mechanism 217.

When the heat exchange amount needed in the refrigeration cycle is changed significantly as a result of the operation with a remote control, the connection state of the stator windings 61 to 63 of the motor 3 that drives the compression mechanism 217 is switched in some cases from a star connection to a delta connection or vice versa according to the change in the heat exchange amount.

In comparison with a delta connection, a star connection provides high operation efficiency in low rotation speed but provides low operation efficiency in high rotation speed. Moreover, with a star connection, when the compression ratio of the compression mechanism 217 is high, winding current becomes excessively large and thus the inverter control circuit 6 in some cases stops the motor 3 to prevent the inverter 2 or the motor 3 from failing. To avoid such a situation, it is necessary to switch the connection state of the stator windings 61 to 63 of the motor 3 from a star connection to a delta connection.

If the operation of the motor 3 is stopped and then the connection state is switched, large current can be prevented or inhibited from being generated during switching of the connection state. Consequently, it is possible to reduce the probability of component failure due to electrical factors such as contact sticking. However, when the operation of the motor 3 of the refrigeration cycle apparatus 200 is stopped, the refrigeration cycle itself is also stopped. While the refrigeration cycle is stopped, for example, the ambient air increases the temperature of the room in which the user is located during the cooling operation and thus the user in the room feels hot.

The motor driving devices 101A to 101D and 101X according to the first to fourth embodiments switch the connection state of the stator windings 61 to 63 in a state where current flows in the stator windings 61 to 63 without stopping the heat exchanging operation by the motor 3; therefore, the heat exchange amount can be changed greatly without stopping the heat exchanging operation by the refrigeration cycle apparatus 200. Therefore, the refrigeration cycle apparatus 200 can perform a rapid operation according to the user's operation, with a remote control and the user does not feel hot or cold.

A hardware configuration of the contact control unit 4 will next be described. FIG. 21 is a diagram illustrating a first example of a hardware configuration of the contact control units of the motor driving devices according to the first to fourth embodiments. A part or all of the functions of the components constituting the contact control unit 4 can be implemented by a processor 301 and a memory 302.

Examples of the processor 301 include a central processing unit (CPU; also referred to as central processing unit, processing unit, computing unit, microprocessor, microcomputer, processor, and digital signal processor (DSP)) and a system large scale integration (LSI). Examples of the memory 302 include a random access memory (RAM) and a read only memory (ROM).

The contact control unit 4 is implemented by the processor 301 reading and executing a contact control program for performing operations of the contact control unit 4, stored in the memory 302. In other words, the contact control program causes a computer to execute the procedures or the methods performed by the contact control unit 4. The memory 302 is also used for a temporary memory when the processor 301 performs various processes.

Figure 22:
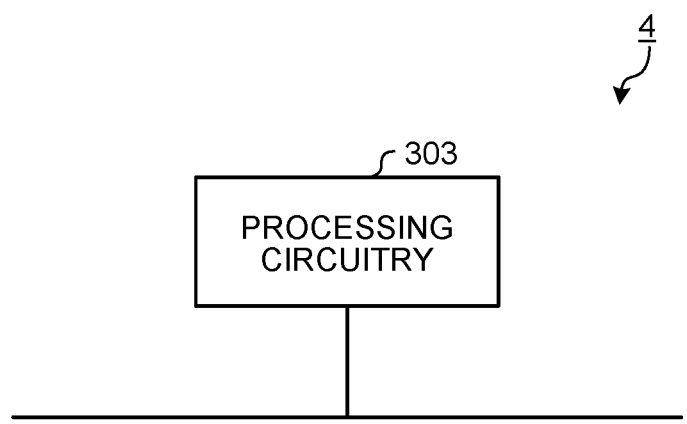
FIG. 22 is a diagram illustrating a second example of a hardware configuration of the contact control units of the motor driving devices according to the first to fourth embodiments.

FIG. 22 is a diagram illustrating a second example of a hardware configuration of the contact control units of the motor driving devices according to the first to fourth embodiments. A part or all of the functions of the components constituting the contact control unit 4 may be implemented by processing circuitry 303.

The processing circuitry 303 is dedicated hardware. The processing circuitry 303 is, for example, a single circuit, a composite circuit, a programmed processor, a parallel programmed processor, an application specific integrated circuit (ASIC), a field-programmable gate array (FPGA), or a combination thereof.

A part of the functions of the contact control unit 4 may be implemented by dedicated hardware and a part of the functions of the contact control unit 4 may be implemented by software or firmware. In other words, a part of the functions of the contact control unit 4 may be implemented by the processor 301 and the memory 302 illustrated in FIG. 21 and the rest of the functions of the contact control unit 4 may be implemented by the dedicated processing circuitry 303.

The contact control unit 4X, the control order determination unit 5C, and the inverter control circuits 6 and 60 descried in the first to fourth embodiments also have a hardware configuration similar to the contact control unit 4, and descriptions thereof will be omitted.

The configurations described in the embodiments above are merely examples of an aspect of the present invention and can be combined with another known technology and part thereof can be omitted or modified without departing from the gist of the present invention.

The invention claimed is:

1. A motor driving device that drives a motor and is capable of switching a connection state of stator windings of the motor, the motor driving device comprising:
a plurality of relays to switch the connection state of the stator windings by switching positions of contact plates; and
a contact controller to control each of the positions of the contact plates by outputting, to a corresponding one of the relays, a signal for actuating a corresponding one of the contact plates, wherein
the contact controller switches the connection state by sequentially switching output values of the signals such that the output values of the signals are switched at different timings from each other in the relays, and changes a switching order every time the connection state is switched, the switching order being an order in which the output values of the signals are switched.

2. The motor driving device according to claim 1, wherein a time difference in switching of the output values of the signals is longer than a variation in operation time of the contact plates.

3. The motor driving device according to claim 1, further comprising a switching order table in which a plurality of types of the switching orders are set, wherein
the contact controller selects, from among the switching orders set in the switching order table, a switching order to be used when switching the connection state.

4. The motor driving device according to claim 3, further comprising a control order storage to store at least one latest switching order used by the contact controller, wherein
the contact controller selects, as a next switching order, a switching order different from the switching order stored in the control order storage.

5. The motor driving device according to claim 3, further comprising a control order setter to store selection order information in which an order in which to use the switching orders is set, wherein
the contact controller selects a next switching order on a basis of the selection order information.

6. The motor driving device according to claim 3, further comprising:
a winding current detector to detect a current value of current flowing in the stator windings; and
a control order determiner to determine a switching order that minimizes short-circuit current generated in the contact plates on a basis of the current value detected by the winding current detector, wherein
the contact controller selects, as a next switching order, a switching order determined by the control order determiner.

7. The motor driving device according to claim 6, wherein
the current value of the current flowing in the stator windings is made smaller when the connection state is switched than at a timing when the connection state is not switched, and
when the winding current detector detects that the current value of the current flowing in the stator windings becomes smaller than the current value at a timing when the connection state is not switched, the contact controller controls switching of the connection state.

8. The motor driving device according to claim 1, wherein, the current value of the current flowing in the stator windings is made smaller when the connection state is switched than at a timing when the connection state is not switched.

9. The motor driving device according to claim 1, wherein the contact controller switches the connection state of the stator windings from a star connection to a delta connection.

10. The motor driving device according to claim 1, further comprising an inverter to generate power supplied to the motor, wherein
the inverter drives the motor.

11. A refrigeration cycle apparatus comprising:
the motor driving device according to claim 1; and
a compressor comprising a motor driven by the motor driving device.

12. The refrigeration cycle apparatus according to claim 11, wherein the motor driving device switches the connection state without a heat exchanging operation of a refrigeration cycle being stopped.

13. A motor driving device that drives a motor and is capable of switching a connection state of the motor, the motor driving device comprising:
an inverter comprising a plurality of switching elements, the inverter switching the connection state of the motor with the switching elements; and
a contact controller to control the inverter by outputting, to each of the switching elements, a signal for controlling a corresponding one of the switching elements, wherein
the contact controller sequentially switches output values of the signals such that the output values of the signals are switched at different timings from each other in the switching elements, and changes a switching order every time the connection state is switched, the switching order being an order in which the output values of the signals are switched.

14. A refrigeration cycle apparatus comprising:
the motor driving device according to claim 13; and
a compressor comprising a motor driven by the motor driving device.

15. The refrigeration cycle apparatus according to claim 14, wherein the motor driving device switches the connection state without a heat exchanging operation of a refrigeration cycle being stopped.

* * * * *